(12) United States Patent
Khirallah et al.

(10) Patent No.: US 12,470,908 B2
(45) Date of Patent: Nov. 11, 2025

(54) COMMUNICATION SYSTEM

(71) Applicant: NEC Corporation, Tokyo (JP)

(72) Inventors: Chadi Khirallah, Surrey (GB);
Jagdeep Ahluwalia Singh, Surrey (GB); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 17/626,848

(22) PCT Filed: Apr. 7, 2021

(86) PCT No.: PCT/JP2021/014685
§ 371 (c)(1),
(2) Date: Jan. 13, 2022

(87) PCT Pub. No.: WO2021/210457
PCT Pub. Date: Oct. 21, 2021

(65) Prior Publication Data
US 2022/0264415 A1 Aug. 18, 2022

(30) Foreign Application Priority Data
Apr. 17, 2020 (GB) ..................................... 2005644

(51) Int. Cl.
| | |
|---|---|
| H04W 8/08 | (2009.01) |
| H04W 8/20 | (2009.01) |
| H04W 36/08 | (2009.01) |
| H04W 36/36 | (2009.01) |
| H04W 48/02 | (2009.01) |
| H04W 48/16 | (2009.01) |
| H04W 76/18 | (2018.01) |
| H04W 76/20 | (2018.01) |

(Continued)

(52) U.S. Cl.
CPC ............... *H04W 8/08* (2013.01); *H04W 8/20* (2013.01); *H04W 36/08* (2013.01); *H04W 36/365* (2013.01); *H04W 48/02* (2013.01); *H04W 48/16* (2013.01); *H04W 76/18* (2018.02); *H04W 76/20* (2018.02); *H04W 84/042* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01)

(58) Field of Classification Search
CPC ... H04W 8/005–30; H04W 12/009–80; H04W 28/02–26; H04W 36/0005–385; H04W 48/02–20; H04W 60/005–06; H04W 74/002–0891; H04W 76/10–50; H04W 84/005–22; H04W 88/005–188; H04W 92/02–24
See application file for complete search history.

(56) References Cited

U.S. PATENT DOCUMENTS

| | | | | |
|---|---|---|---|---|
| 2020/0275279 | A1* | 8/2020 | Tangudu | H04W 8/06 |
| 2020/0314732 | A1* | 10/2020 | Park | H04W 8/08 |
| 2022/0377548 | A1* | 11/2022 | Rajadurai | H04W 8/02 |

OTHER PUBLICATIONS

R2-2003608, Samsung, 3GPP Draft, Apr. 2020, pp. 1-2 (Year: 2020).*

(Continued)

*Primary Examiner* — Timothy J Weidner

(57) ABSTRACT

Methods and apparatus are disclosed for controlling whether a user equipment (UE) is allowed to access a cell of a closed access group (CAG) when the CAG is selected manually by a user of the UE.

3 Claims, 11 Drawing Sheets

(51) Int. Cl.
*H04W 84/04* (2009.01)
*H04W 88/02* (2009.01)
*H04W 88/08* (2009.01)
*H04W 88/12* (2009.01)
*H04W 88/18* (2009.01)
*H04W 92/02* (2009.01)
*H04W 92/10* (2009.01)
*H04W 92/12* (2009.01)

(56) References Cited

OTHER PUBLICATIONS

International Search Report for PCT Application No. PCT/JP2021/014685, mailed on Jul. 2, 2021.
English translation of Written opinion for PCT Application No. PCT/JP2021/014685, mailed on Jul. 2, 2021.
GB Office Action for GB Application No. 2005644.6, mailed on Dec. 8, 2020.
3GPP TS 36.331 V15.7.0, "Evolved Universal Terrestrial Radio Access (E-UTRA); Radio Resource Control (RRC);Protocol specification", Sep. 2019, pp. 1-962.
3GPP TS 38.331 V16.0.0, "Radio Resource Control (RRC) protocol specification", Mar. 2020, pp. 1-835.
3GPP TS 22.261 V17.0.1, "Service requirements for the 5G system", Oct. 2019, pp. 1-82.
3GPP TS 23.501 V16.4.0, "System architecture for the 5G System (5GS)", Mar. 2020, pp. 1-430.
3GPP TS 38.300 V16.1.0, "NR; NR and NG-RAN Overall Description", Mar. 2020, pp. 1-133.
3GPP TS 38.304 V16.0.0, "User Equipment (UE) procedures in Idle mode and RRC Inactive state", Mar. 2020, pp. 1-38.
3GPP TS 22.368 V13.1.0, "Service requirements for Machine-Type Communications(MTC)", Dec. 2014, pp. 1-26.
NGMN, "NGMN 5G White Paper", V 1.0, Feb. 17, 2015, pp. 1-125.
S2-2002682, SA WG2,3GPP Draft, Apr. 2020, pp. 1-2.
R2-2003608, Samsung,3GPP Draft, Apr. 2020, pp. 1-2.
C1-200581, Samsung,3GPP Draft, Feb. 2020, pp. 1-40.
3GPP TR 23.734 V16.2.0, "Study on enhancement of 5G System (SGS) for vertical and Local Area Network (LAN) services", Jun. 2019, pp. 1-117.
S2-2002681, VIVO, 3GPP Draft, Apr. 2020, pp. 1-4.
JP Office Action for JP Application No. 2022-505326, mailed on Nov. 29, 2022 with English Translation.
3GPP TSG-RAN WG2 Meeting #109 bis electronic R2-2002594, Ericsson, Manual Selection of PNI NPN, pp. 1-5 3GPP.
3GPP TSG-RAN WG2 Meeting #109 bis-e R2-2002659, Nokia (Rapporteur), Report from email discussion [Post109e#18][PRN] Remaining open issues, pp. 1-36.
JP Office Action for JP Application No. 2022-505326, mailed on Mar. 28, 2023 with English Translation.
ZTE, "Consideration on selected CAG ID", 3GPP TSG-RAN WG3 #107bis-e, R3-201922, Apr. 2020.

* cited by examiner

NG based Handover

COMMUNICATION SYSTEM

This application is a National Stage Entry of PCT/JP2021/014685 filed on Apr. 7, 2021, which claims priority from Great Britain Patent Application 2005644.6 filed on Apr. 17, 2020, the contents of all of which are incorporated herein by reference, in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof (including LTE-Advanced and Next Generation or 5G networks). The invention has particular, although not necessarily exclusive relevance to Non-Public Networks (NPNs) that may be deployed with the support of PLMNs (Public Land Mobile Networks) using associated Closed Access Groups (CAGs).

BACKGROUND ART

Recent developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core network.

Under the 3GPP standards, a NodeB (or an eNB in LTE, gNB in 5G) is the base station via which communication devices (user equipment or 'UE') connect to a core network and communicate to other communication devices or remote servers. For simplicity, the present application will use the term base station to refer to any such base stations.

In the current 5G architecture, for example, the gNB internal structure is split into two parts known as the Central Unit (CU) and the Distributed Unit (DU), connected by an F1 interface. This enables the use of a 'split' architecture, whereby the, typically 'higher', CU layers (for example, but not necessarily or exclusively, PDCP) and the, typically 'lower', DU layers (for example, but not necessarily or exclusively, RLC/MAC/PHY) to be implemented separately. Thus, for example, the higher layer CU functionality for a number of gNBs may be implemented centrally (for example, by a single processing unit, or in a cloud-based or virtualised system), whilst retaining the lower layer DU functionality locally, in each of the gNB.

For simplicity, the present application will use the term mobile device, user device, or UE to refer to any communication device that is able to connect to the core network via one or more base stations. Although the present application often refers to mobile devices in the description, it will be appreciated that the technology described can be implemented on any communication devices (mobile and/or generally stationary) that can connect to a communications network for sending/receiving data, regardless of whether such communication devices are controlled by human input or software instructions stored in memory.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems, and the like. Effectively, the Internet of Things is a network of devices (or "things") equipped with appropriate electronics, software, sensors, network connectivity, and/or the like, which enables these devices to collect and exchange data with each other and with other communication devices. It will be appreciated that IoT devices are sometimes also referred to as Machine-Type Communication (MTC) communication devices or Machine-to-Machine (M2M) communication devices.

The core network (i.e. the EPC in case of LTE) typically hosts functionality for subscriber management, mobility management, charging, security, and call/session management (amongst others), and provides connection for communication devices to external networks, such as the Internet.

Communication between mobile devices and base stations is controlled using a Radio Resource Control (RRC) protocol as defined in 3GPP Technical Specification (TS) 36.331 V15.7.0 (for E-UTRA) and 3GPP TS 38.331 V17.1.0 (for NR). RRC handles the control plane signalling of Layer 3 between mobile telephones and the radio access network, and includes, amongst other things, functions for broadcasting system information, paging, connection establishment and release, radio bearer establishment, reconfiguration and release, mobility procedures, and power control. A mobile device may operate either in an 'RRC idle mode' (in which no data communication takes place) or an 'RRC connected mode' (in which data communication may take place between the mobile device and its serving base station). In addition, the so-called 'RRC inactive' state (in 5G) and 'light-connected' (LC) state/mode (in LTE/4G) have been introduced, which refer to the scenario where the core network maintains both the control-plane and user-plane connection for the UE even after the UE's RRC connection has been suspended by its serving base station (when the UE has no more data to send or receive). In other words, the connection state of the UE may be different from the access network point of view than from the core network point of view.

3GPP is currently specifying support for Non-Public Networks (NPNs). A NPN is defined as a network that is intended for non-public use, and is discussed in detail in 3GPP TS 22.261 V17.0.1, Service Requirements for the 5G System. In other words, a NPN is intended for the sole use of a private entity such as an enterprise or organisation and may be deployed in a variety of configurations, utilising both virtual and physical elements. Specifically, an NPN may be deployed as described in 3GPP TS 23.501 V16.4.0 in more detail:

a Stand-alone Non-Public Network (SNPN), i.e. operated by an NPN operator and not relying on network functions provided by a PLMN, or a Public Network integrated NPN (PNI-NPN), i.e. a NPN deployed with the support of a PLMN.

SNPN 5GS deployments are based on the architecture depicted in 3GPP TS 23.501, clause 4.2.3, and the additional functionality covered in clause 5.30.2.

PNI-NPN can be enabled using network slicing (see Annex D of 3GPP TS 23.501). To prevent unauthorized UEs from trying to access a PNI-NPN, the Closed Access Group (CAG) functionality described in clause 5.30.3 of 3GPP TS 23.501 can also be used.

In more detail, CAG Access Control is used to enable NPNs to be deployed as part of a PLMN. A CAG identifies a group of subscribers who are permitted to access one or more CAG cells associated to the CAG. A CAG is identified by a corresponding CAG identifier broadcast in System Information Block 1 (SIB 1). When a UE accesses a CAG cell, the network verifies whether the UE is allowed to access the CAG cell. This is also known as UE CAG membership verification. In order to facilitate such a verification, each CAG-capable UE can be configured with the following per PLMN:

an Allowed CAG list containing the CAG identifiers which the UE is allowed to access; and a CAG-only indication if the UE is only allowed to access 5GS via CAG cells.

Typically, the membership or access verification process is performed by the Access and Mobility Function included in the core network, as it is implemented in a module that is located in a physically secure place (usually the location in which the NPN is to be used).

In accordance with 3GPP TS 23.501, the Mobility Restrictions functionality may be used to restrict a UE's mobility according to the Allowed CAG list (if configured in the subscription) and to include an indication whether that UE is only allowed to access CAG cells (if configured in the subscription). If the UE is accessing a 5G system via a CAG cell, during transition from CM-IDLE (i.e. when the UE does not have a signalling connection with the core network, e.g. the AMF) to CM-CONNECTED (i.e. when the UE does have a signalling connection with the core network/AMF), the AMF verifies whether UE access is allowed by the relevant Mobility Restrictions.

It is also possible to update the Mobility Restrictions configuration for a UE. Specifically, when the AMF receives the so called 'Nudm_SDM_Notification' message from the Unified Data Management (UDM) function, and the AMF determines that the Allowed CAG list or the indication whether the UE is only allowed to access CAG cells have changed, the AMF updates the Mobility Restrictions in the UE and NG-RAN according to the received message.

Recently, 3GPP has agreed that a CAG cell which is not considered as a suitable cell can be an acceptable cell for a Rel-16 UE not in Stand-alone Non-Public Network Access Mode (SNPN AM).

3GPP TS 38.300 provides an overview of the mobility procedures for Rel-16 UEs configured for CAG. In summary, a CAG Member Cell for a UE is a cell broadcasting the identity of the selected PLMN, registered PLMN or equivalent PLMN, and for that PLMN, a CAG identifier belonging to the Allowed CAG list of the UE for that PLMN. The UE checks the suitability of CAG cells based on the Allowed CAG list provided by upper layers and a CAG-only cell can only be suitable for its subscribers but can be acceptable for the rest. It will be appreciated that a Rel-15 UE considers a CAG-only cell as an acceptable cell if the cell is not barred to Rel-15 UEs, and if a PLMN ID without CAG list is broadcast and that PLMN is forbidden (e.g. by use of a PLMN ID for which all registration attempts are rejected such that the PLMN ID becomes forbidden). When the UE is configured with a CAG-only indication, only CAG Member Cells can be suitable. A non-suitable cell can be acceptable though if the UE is configured with a CAG-only indication for one of the PLMN broadcast by the cell.

In addition, manual selection of CAG cell(s) is supported, for which an associated Human Readable Network Name (HRNN) can be optionally provided (or multiple HRNNs if appropriate). When a cell broadcasts any CAG IDs or Namespace Identifiers (NIDs), an NPN-capable Rel-16 UE can treat the cell with cellReservedForOtherUse=true as a candidate during cell selection and cell reselection.

Further details of manual CAG selection are given in 3GPP TS 38.304 V16.0.0. In the UE, on request of the Non-Access Stratum (NAS), the Access Stratum (AS) scans all channels in the NR bands according to its capabilities to find available CAGs. On each carrier, the UE searches at least for the strongest cell, reads its system information and reports any available CAG ID(s) together with their HRNN (if broadcast) and PLMN(s) to the NAS. The search for available CAGs may be stopped on request of the NAS. If NAS has selected a CAG and provided this selection to AS, the UE shall search for an acceptable or suitable cell belonging to the selected CAG to camp on, and give an indication to NAS that access is possible (for registration).

However, 3GPP has identified a potential issue with the manual CAG selection procedure. Specifically, if a UE performs manual CAG selection and a successful registration, then it is not clearly defined whether the UE shall stay on cells supporting the manually selected CAG ID in RRC_CONNECTED state, especially in the case when after registration the Allowed CAG List in the UE does not contain the manually selected CAG ID.

SUMMARY OF INVENTION

Accordingly, preferred example embodiments of the present invention aim to provide methods and apparatus which address or at least partially deal with the above issue.

Although for efficiency of understanding for those of skill in the art, the invention will be described in detail in the context of a 3GPP system (UMTS, LTE, NR), the principles of the invention can be applied to other systems in which communication devices or User Equipment (UE) access a core network using a radio access technology.

In one example aspect, the invention provides a method performed by a base station in a Non-Public communication Network in which the base station operates at least one closed access group (CAG) cell, the method comprising: receiving, from a user equipment (UE), a message initiating a communications connection via a CAG cell operated by the base station, wherein the CAG cell is associated with a CAG having a CAG identifier which has been manually selected by a user of the UE; determining, based on subscription information associated with the UE and information identifying that said CAG identifier has been manually selected, whether to allow the UE to access the CAG cell; and managing access of the UE to the CAG cell in dependence on said determination.

In one example aspect, the invention provides a method by an Access and Mobility Function (AMF) coupled to a base station in a Non-Public communication Network in which the base station operates at least one closed access group (CAG) cell, the method comprising: receiving, from a user equipment (UE) in a CAG cell operated by the base station, a message initiating a communications connection via said CAG cell; obtaining, from a core network function, subscription information associated with the UE for performing CAG membership verification; determining, based on the message received from the UE and/or the obtained subscription information, that the CAG cell is associated with a CAG having a CAG identifier which has been manually selected by a user of the UE, and determining that the UE is not allowed to access that CAG; and managing access of the UE to the CAG cell, or another CAG cell having the same associated CAG identifier, in dependence on said determination.

In one example aspect, the invention provides a method performed by a Unified Data Management (UDM) function or an Authentication Server Function (AUSF) coupled to a Non-Public communication Network in which a base station operates at least one closed access group (CAG) cell, the method comprising: receiving, from an Access and Mobility Function (AMF), a CAG identifier associated with a CAG cell operated by the base station, and information identifying a user equipment (UE) attempting to initiate a communications connection via said CAG cell by manually selecting said CAG identifier; determining, based on subscription information associated with the UE, whether said UE is subscribed to said CAG; and when it is determined that the UE is not subscribed to said CAG, adding said CAG identifier to a list of Allowed CAG identifiers associated with the UE, and sending said list of Allowed CAG identifiers to the AMF, including said manually selected CAG identifier, for use in managing access of the UE to the CAG cell.

In one example aspect, the invention provides a method performed by a base station in a Non-Public communication Network in which the base station operates at least one closed access group (CAG) cell, the method comprising: serving a user equipment (UE) via a CAG cell operated by the base station, wherein the CAG cell is associated with a CAG having a CAG identifier which has been manually selected by a user of the UE; and initiating a procedure for handing over the UE to a target cell having the same manually selected CAG identifier, and transmitting, to at least one of a base station operating the target cell and an Access and Mobility Function (AMF), information identifying that said CAG identifier has been manually selected and/or information identifying at least one service that is not allowed for the UE in said CAG.

In one example aspect, the invention provides a method performed by a base station in a Non-Public communication Network in which the base station operates at least one closed access group (CAG) cell as a handover target cell, the method comprising: receiving, from a source base station serving a user equipment (UE) via a source cell having an associated CAG identifier, a message initiating a procedure for handing over the UE to the target cell having the same CAG identifier, the message including information identifying that said CAG identifier has been manually selected and/or information identifying at least one service that is not allowed for the UE in said CAG.

In one example aspect, the invention provides a method performed by a base station in a Non-Public communication Network in which the base station operates at least one closed access group (CAG) cell, the method comprising: holding, for a user equipment (UE), a list of at least one CAG identifier associated with respective CAG(s) that the UE is allowed to access; obtaining, while the UE is in a Radio Resource Control (RRC) Inactive state, information indicating a change to said list; and managing access of the UE to said at least one CAG cell based on the obtained information.

In one example aspect, the invention provides a base station in a Non-Public communication Network in which the base station operates at least one closed access group (CAG) cell, the base station comprising: means for receiving, from a user equipment (UE), a message initiating a communications connection via a CAG cell operated by the base station, wherein the CAG cell is associated with a CAG having a CAG identifier which has been manually selected by a user of the UE; means for determining, based on subscription information associated with the UE and information identifying that said CAG identifier has been manually selected, whether to allow the UE to access the CAG cell; and means for managing access of the UE to the CAG cell in dependence on said determination.

In one example aspect, the invention provides an Access and Mobility Function (AMF) coupled to a base station in a Non-Public communication Network in which the base station operates at least one closed access group (CAG) cell, the AMF comprising: means for receiving, from a user equipment (UE) in a CAG cell operated by the base station, a message initiating a communications connection via said CAG cell; means for obtaining, from a core network function, subscription information associated with the UE for performing CAG membership verification; means for determining, based on the message received from the UE and/or the obtained subscription information, that the CAG cell is associated with a CAG having a CAG identifier which has been manually selected by a user of the UE, and for determining that the UE is not allowed to access that CAG; and means for managing access of the UE to the CAG cell, or another CAG cell having the same associated CAG identifier, in dependence on said determination.

In one example aspect, the invention provides an apparatus configured as a Unified Data Management (UDM) function or an Authentication Server Function (AUSF) coupled to a Non-Public communication Network in which a base station operates at least one closed access group (CAG) cell, the apparatus comprising: means for receiving, from an Access and Mobility Function (AMF), a CAG identifier associated with a CAG cell operated by the base station, and information identifying a user equipment (UE) attempting to initiate a communications connection via said CAG cell by manually selecting said CAG identifier; means for determining, based on subscription information associated with the UE, whether said UE is subscribed to said CAG; and means for adding, when it is determined that the UE is not subscribed to said CAG, said CAG identifier to a list of Allowed CAG identifiers associated with the UE, and for sending said list of Allowed CAG identifiers to the AMF, including said manually selected CAG identifier, for use in managing access of the UE to the CAG cell.

In another example aspect, the invention provides a base station in a Non-Public communication Network in which the base station operates at least one closed access group (CAG) cell, the base station comprising a controller and a transceiver, wherein the controller is configured to: control the transceiver to receive, from a user equipment (UE), a message initiating a communications connection via a CAG cell operated by the base station, wherein the CAG cell is associated with a CAG having a CAG identifier which has been manually selected by a user of the UE; determine, based on subscription information associated with the UE and information identifying that said CAG identifier has been manually selected, whether to allow the UE to access the CAG cell; and manage access of the UE to the CAG cell in dependence on said determination.

In another aspect, the invention provides an Access and Mobility Function (AMF) coupled to a base station in a Non-Public communication Network in which the base station operates at least one closed access group (CAG) cell, the AMF comprising a controller and a transceiver, wherein the controller is configured to: control the transceiver to receive, from a user equipment (UE) in a CAG cell operated by the base station, a message initiating a communications connection via said CAG cell; obtain, from a core network function, subscription information associated with the UE for performing CAG membership verification; determine, based on the message received from the UE and/or the obtained subscription information, that the CAG cell is associated with a CAG having a CAG identifier which has been manually selected by a user of the UE, and determine that the UE is not allowed to access that CAG; and manage access of the UE to the CAG cell, or another CAG cell having the same associated CAG identifier, in dependence on said determination.

In another aspect, the invention provides an apparatus configured as a Unified Data Management (UDM) function or an Authentication Server Function (AUSF) coupled to a Non-Public communication Network in which a base station operates at least one closed access group (CAG) cell, the apparatus comprising a controller and a transceiver, wherein the controller is configured to: control the transceiver to receive, from an Access and Mobility Function (AMF), a CAG identifier associated with a CAG cell operated by the base station, and information identifying a user equipment (UE) attempting to initiate a communications connection via said CAG cell by manually selecting said CAG identifier; determine, based on subscription information associated with the UE, whether said UE is subscribed to said CAG; and add, when it is determined that the UE is not subscribed to said CAG, said CAG identifier to a list of Allowed CAG identifiers associated with the UE, and for sending said list of Allowed CAG identifiers to the AMF, including said manually selected CAG identifier, for use in managing access of the UE to the CAG cell.

Example aspects of the invention extend to corresponding systems, apparatus, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Figure 1:
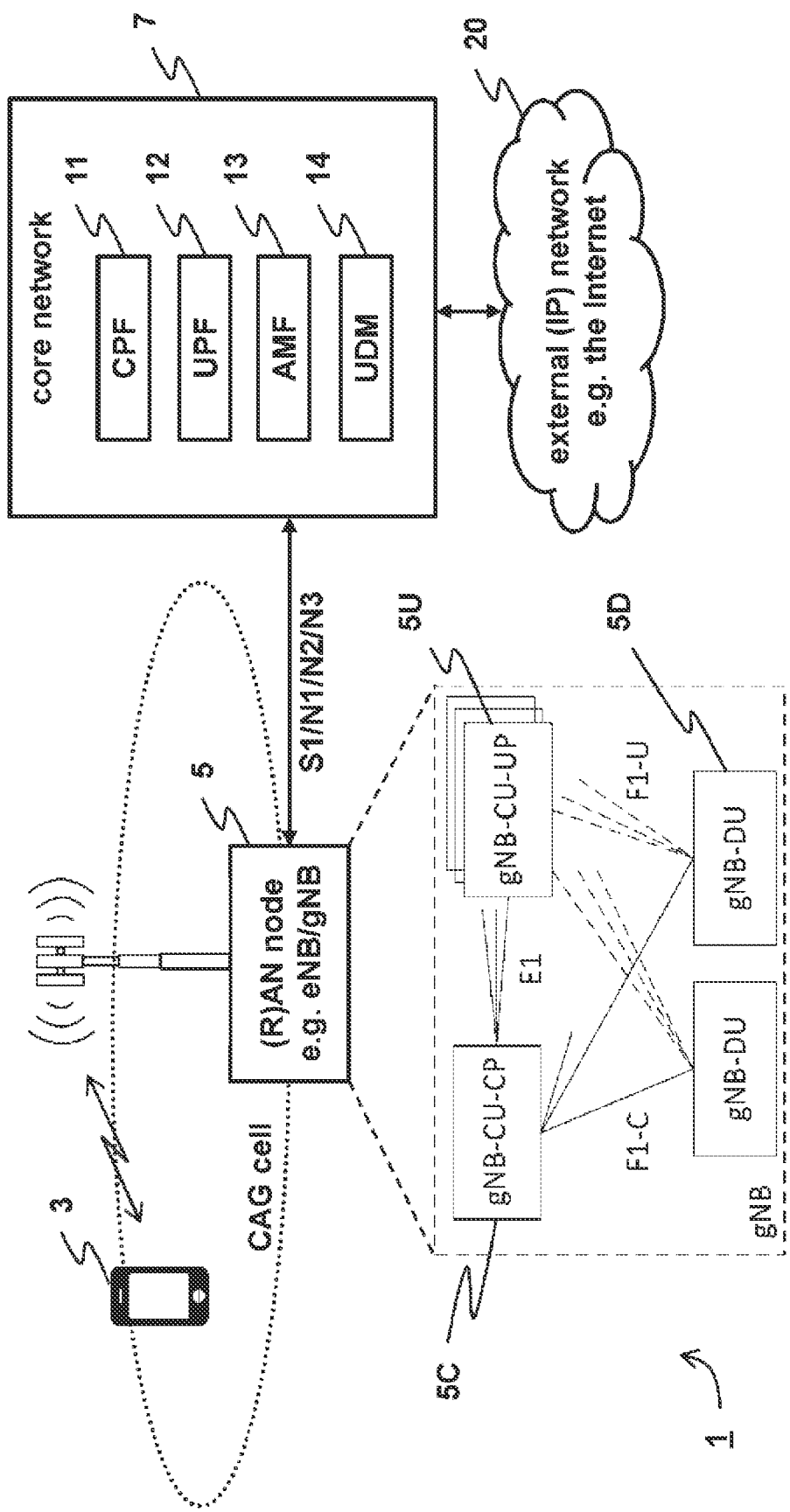
FIG. 1 illustrates schematically a mobile (cellular or wireless) telecommunication system to which example embodiments of the invention may be applied.

FIG. 1 schematically illustrates a mobile (cellular or wireless) telecommunication system 1 to which example embodiments of the present invention are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

It will be appreciated that the functionality of a gNB 5 (referred to herein as a 'distributed' gNB) may be split between one or more distributed units (DUs) and a central unit (CU) with a CU typically performing higher level functions and communication with the next generation core and with the DU performing lower level functions and communication over an air interface with UEs in the vicinity (i.e. in a cell operated by the gNB). A distributed gNB includes the following functional units:

gNB Central Unit (gNB-CU): a logical node hosting Radio Resource Control (RRC), Service Data Adaptation Protocol (SDAP) and Packet Data Convergence Protocol (PDCP) layers of the gNB or RRC and PDCP layers of the En-gNB that controls the operation of one or more gNB-DUs. The gNB-CU terminates the F1 interface connected with the gNB-DU.

gNB Distributed Unit (gNB-DU) 5D: a logical node hosting Radio Link Control (RLC), Medium Access Control (MAC) and Physical (PHY) layers of the gNB or En-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP) 5C: a logical node hosting the RRC and the control plane part of the PDCP protocol of the gNB-CU for an En-gNB or a gNB. The gNB-CU-CP terminates the E1 interface connected with the gNB-CU-UP and the F1-C interface connected with the gNB-DU.

gNB-CU-User Plane (gNB-CU-UP) 5U: a logical node hosting the user plane part of the PDCP protocol of the gNB-CU for an En-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 11 and user plane functions (UPFs) 12. It will be appreciated that the core network 7 may also include, amongst others, an Access and Mobility Management Function (AMF) 13 and Unified Data Management (UDM) function 14. From the core network 7, connection to an external IP network 20 (such as the Internet) may also be provided.

In order to provide (public network integrated) non-public network (NPN) functionality, one or more cells of this system are associated with one or more CAG. For example, the cell of the base station 5 shown in FIG. 1 may be associated with CAG #1 (which may also be identified to the subscribers by an appropriate name and/or other appropriate description). It will be appreciated that each cell may be associated with more than one CAG, although some cells may not be available for any CAG. Whilst UEs 3 with CAG functionality are configured to select an appropriate CAG cell automatically, whenever possible, manual CAG selection is also possible in this system, as described in the following.

When the user (subscriber) of the UE 3 performs manual CAG selection (e.g. select CAG #1, e.g. based on its associated name/description), the UE 3 attempts to find a cell to camp on that belongs to the manually selected CAG ID. Once a cell of the selected CAG is found, the UE 3 starts a registration process on the cell. The registration involves communicating with an AMF 13 (e.g. by way of NAS messages transmitted via the base station 5). If not yet available, the AMF 13 retrieves the UE CAG membership (UE subscription CAG ID list) from the UDM function 14 and performs UE access verification. When the AMF 13 determines, based on the UE CAG membership, that the manually selected CAG ID is not part of the UE's subscription, the AMF 13 may be configured to keep the UE 3 on the selected cell (i.e. the cell of the base station 5 that belongs to the manually selected CAG ID #1). This may be beneficial for example for the purposes of load balancing among the cells of the network 1 and/or for the provision of appropriate services (e.g. Quality of Service, Quality of Experience, type of service etc.) which may not be possible via other cells in the vicinity of the UE 3.

In order to ensure that the UE 3 is able to continue using the manually selected CAG (and hence avoid having to re-select to a cell that belongs to a different CAG), the AMF 13 informs the UDM function 14 about the CAG selected by the UE 3 (when the AMF 13 decides to keep the UE 3 on that cell). Specifically, the AMF 13 sends the manually selected CAG ID to the UDM function 14 and requests updating the UE CAG membership (UE subscription) to include the manually selected CAG ID as well. In other words, the AMF 13 (and/or another core network node) may be configured to override the currently applicable UE subscription information in order to comply with the manual CAG selection by the user of the UE 3 (possibly in dependence on appropriate network criteria associated with the UE 3 and/or the selected CAG).

When the UE 3 is allowed to access the manually selected CAG, the AMF 13 informs the serving base station 5 about this. For example, the AMF 13 may include the manually selected CAG in the UE specific list of allowed CAGs, when requesting the base station to set up an initial context for the UE 3. In some cases, although the UE 3 may be allowed to access the manually selected CAG, some services may not be available in that CAG. In other words, the UE 3 may be allowed to access the manually selected CAG with a lower priority than other UEs. If the UE 3 is not allowed to access the manually selected CAG, then the AMF 13 informs the serving base station 5 about this (e.g. by indicating that the CAG is a manually selected one and/or indicating that the selected CAG is not allowed for the UE 3). In this case, the base station 5 may be configured to move the UE 3 to the RRC Idle mode or to hand it over to a suitable cell (e.g. based on the list of CAGs allowed for the UE 3).

Mobile Device

Figure 2:
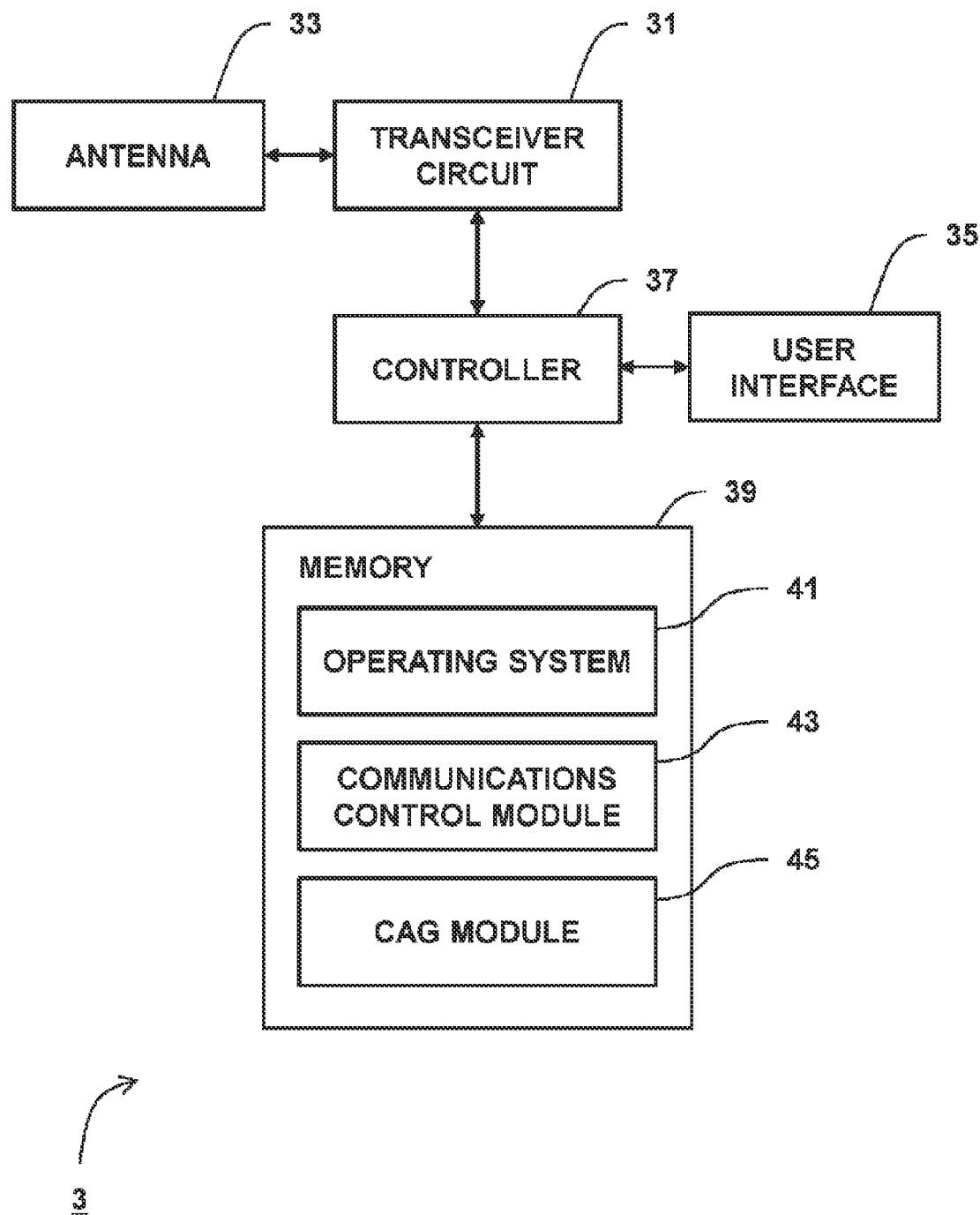
FIG. 2 is a block diagram of a User Equipment (UE) forming part of the system shown in FIG. 1.

FIG. 2 is a block diagram illustrating the main components of the mobile device 3 shown in FIG. 1 (e.g. a mobile telephone or an IoT device). As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily required for its operation, the mobile device 3 might of course have all the usual functionality of a conventional mobile telephone (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile device 3 by, in this example, program instructions or software instructions stored within memory 39. As shown, these software instructions include, among other things, an operating system 41, a communications control module 43, and a CAG module 45.

The communications control module 43 is operable to control the communication between the mobile device 3 and its serving base station 5 (and other communication devices connected to the serving base station 5, such as other user equipment, core network nodes, etc.). The communications control module 43 is also operable to control cell selection by the UE 3, based on information from the CAG module 45, if appropriate.

Although not shown in FIG. 2, the communications control module 43 will typically include at least an RRC sub-module and a NAS sub-module. The RRC sub-module is operable to generate, send and receive signalling messages formatted according to the RRC standard. For example, such messages are exchanged between the mobile device 3 and its serving base station 5. The NAS sub-module is operable to generate, send and receive signalling messages formatted according to the NAS standard. For example, such NAS messages are exchanged between the mobile device 3 and the AMF 13 (via the serving base station 5, using the RRC sub-module). The RRC/NAS messages may include, for example, messages relating to manual CAG selection by a user of the mobile device 3 and/or updating a tracking area (or cell) where the mobile device 3 is currently located.

The CAG module 45 is responsible for maintaining a list of CAGs associated with the UE's subscription for cell selection and for facilitating manual CAG selection (including selection of CAGs not included in the list of subscribed CAGs).

Base Station

Figure 3:
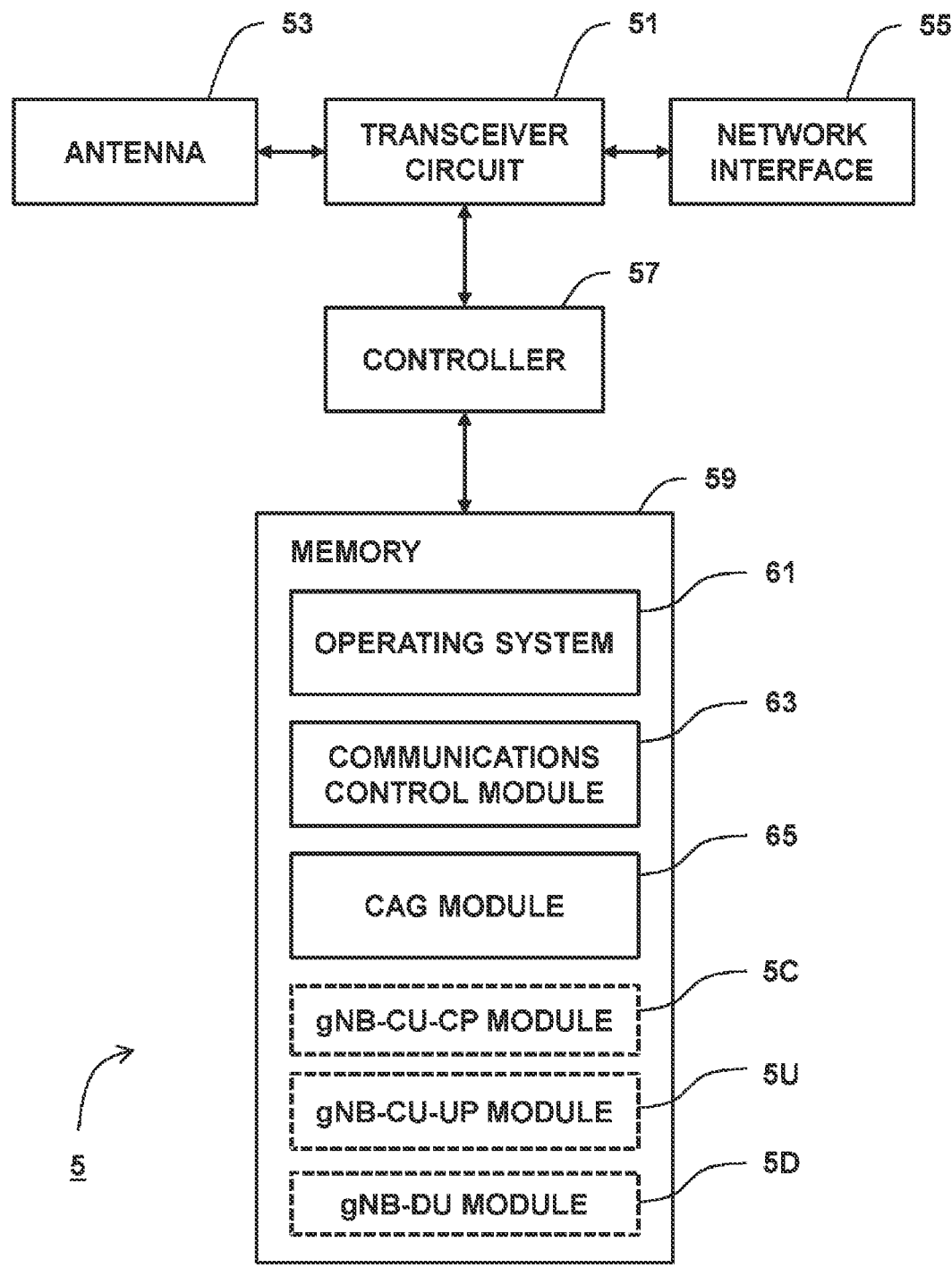
FIG. 3 is a block diagram of a base station forming part of the system shown in FIG. 1.

FIG. 3 is a block diagram illustrating the main components of a base station 5 shown in FIG. 1. As shown, the base station 5 has a transceiver circuit 51 for transmitting signals to and for receiving signals from user equipment (such as the mobile device 3) via one or more antenna 53, a core network interface 55 (e.g. an S1 interface, NG-C interface, and/or the like) for transmitting signals to and for receiving signals from the core network 7, and a base station interface 56 (e.g. an X2 interface, Xn interface, and/or the like) for transmitting signals to and for receiving signals from neighbouring base stations. The base station 5 has a controller 57 to control the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, a communications control module 63, and a CAG module 65.

The communications control module 63 is responsible for handling (generating/sending/receiving) signalling between the base station 5 and other nodes, such as the UE 3 and the core network nodes. Such signalling may include, for example, control data for managing operation of the mobile device 3 (e.g. NAS, RRC, paging, system information, and/or the like). The communications control module 63 is also responsible for controlling communications/RRC state transitions by the UEs 3 served by the base station 5 in accordance with their associated CAG membership.

The CAG module 65 is responsible for maintaining respective lists of CAGs associated with the UEs served by the base station 5 and for facilitating manual CAG selection.

When the base station 5 comprises a distributed gNB or En-gNB, the network interface 55 also includes an E1 interface and an F1 interface (F1-C for the control plane and F1-U for the user plane) to communicate signals between respective functions of the distributed gNB or En-gNB. In this case, the software also includes at least one of: a gNB-CU-CP module 5C, a gNB-CU-UP module 5U, and a gNB-DU module 5D. If present, the gNB-CU-CP module 5C hosts the RRC layer and the control plane part of the PDCP layer of the distributed gNB or En-gNB. If present, the gNB-CU-UP module 5U hosts the user plane part of the PDCP and the SDAP layers of the distributed gNB or the user plane part of the PDCP layer of the distributed En-gNB. If present, the gNB-DU module 5D hosts the RLC, MAC, and PHY layers of the distributed gNB or En-gNB.

It will be understood by a person skilled in the art that the central unit (e.g. 5C and/or 5U) may be implemented and physically located with the base station or may be implemented at a remote location, as a single physical element or as a cloud-based or virtualised system. It will also be understood that a single central unit may serve multiple base stations 5.

Although not shown in FIG. 3, the communications control module 63 will also typically include an RRC sub-module, a base station to base station interface sub-module (e.g. X2/Xn), and a core network interface sub-module.

The RRC sub-module is operable to generate, send and receive signalling messages formatted according to the RRC standard. For example, such messages are exchanged between the mobile device 3 and its serving base station 5. The RRC sub-module is also operable to send to (and receive from) the mobile device 3 NAS messages encapsulated in appropriate RRC messages. The RRC/NAS messages may include, for example, messages relating to manual CAG selection by a user of the mobile device 3 and/or updating a tracking area (or cell) where the mobile device 3 is currently located.

The base station to base station interface sub-module is operable to generate, send and receive signalling messages (X2/Xn messages) formatted according to the X2AP (in LTE) or XnAP standard (in 5G).

The core network interface sub-module is operable to generate, send and receive signalling messages formatted according to the S1AP (in LTE) or NG-C standard (in 5G). For example, such messages are exchanged between the base station 5 and the AMF 13. The S1AP (or NG-C) messages may include, for example, NAS messages received from (or addressed to) the mobile device 3.

Core Network Node

Figure 4:
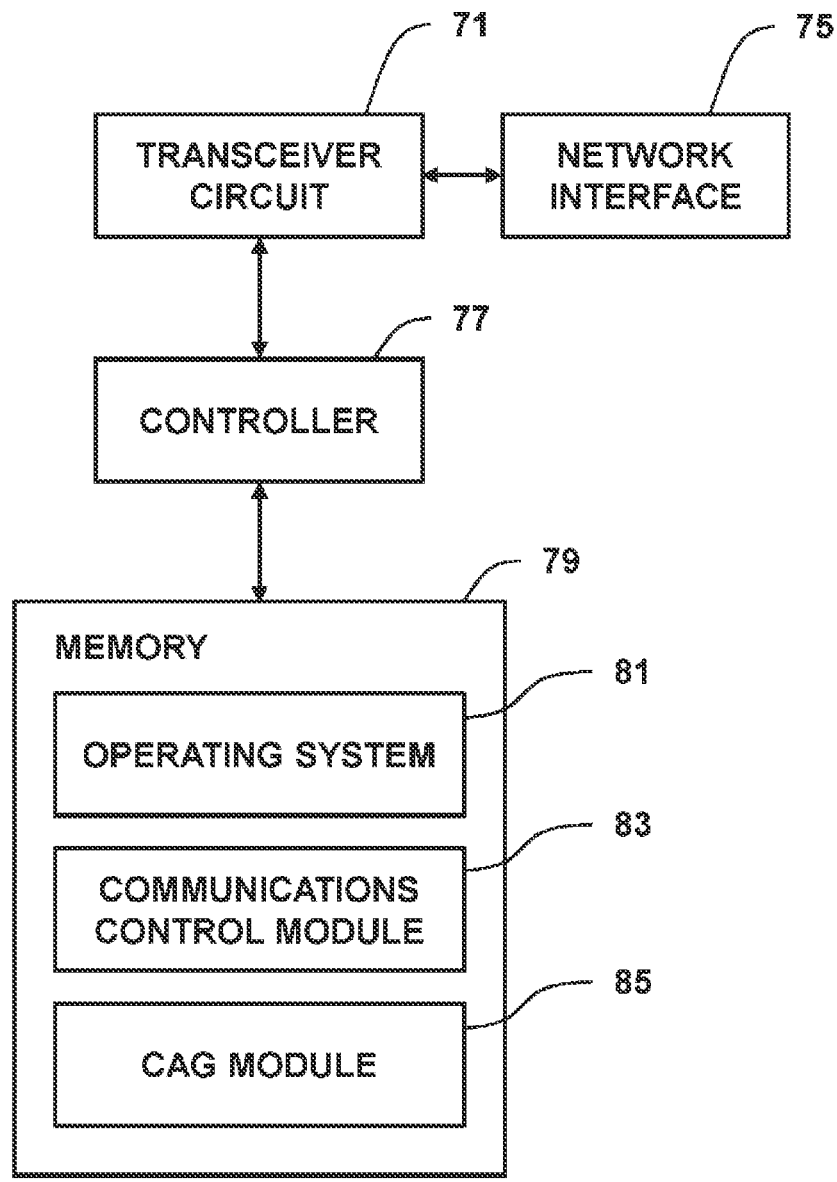
FIG. 4 is a block diagram of a core network node entity forming part of the system shown in FIG. 1.

FIG. 4 is a block diagram illustrating the main components of a generic core network node (or function) shown in FIG. 1, for example, the AMF 13 or the UDM function 14. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81, a communications control module 83, and a CAG module 85.

The communications control module 83 is responsible for handling (generating/sending/receiving) signaling between the core network node and other nodes, such as the UE 3, the (R)AN node 5, and other core network nodes. Such signaling includes appropriately formatted requests and responses relating to manual CAG selection and associated UE subscription update.

Although not shown in FIG. 4, the communications control module 83 will typically include at least a NAS sub-module. The NAS sub-module is operable to generate, send and receive signalling messages formatted according to the NAS standard. For example, such NAS messages are exchanged between the mobile device 3 and the AMF 13 (via the serving base station 5). The NAS messages may include, for example, messages relating to manual CAG selection by a user of the mobile device 3 (e.g. as part of a registration of the mobile device 3 with the AMF 13).

The CAG module 85 is responsible for maintaining respective lists of CAGs associated with each UE 3 registered with the core network node (e.g. AMF 13/UDM function 14) and for facilitating manual CAG selection.

PNI-NPN Architecture Options

As explained above, in the current 5G architecture, for example, the gNB internal structure may be split into two parts known as the Central Unit (CU) and the Distributed Unit (DU), connected by an F1 interface. This enables the use of a 'split' architecture, whereby the, typically 'higher', CU layers (for example, but not necessarily or exclusively, PDCP) and the, typically 'lower', DU layers (for example, but not necessarily or exclusively, RLC/MAC/PHY) to be implemented separately. Thus, for example, the higher layer CU functionality for a number of gNBs may be implemented centrally (by a single unit), whilst retaining the lower layer DU functionality locally, in each of the gNB.

Figure 5A:
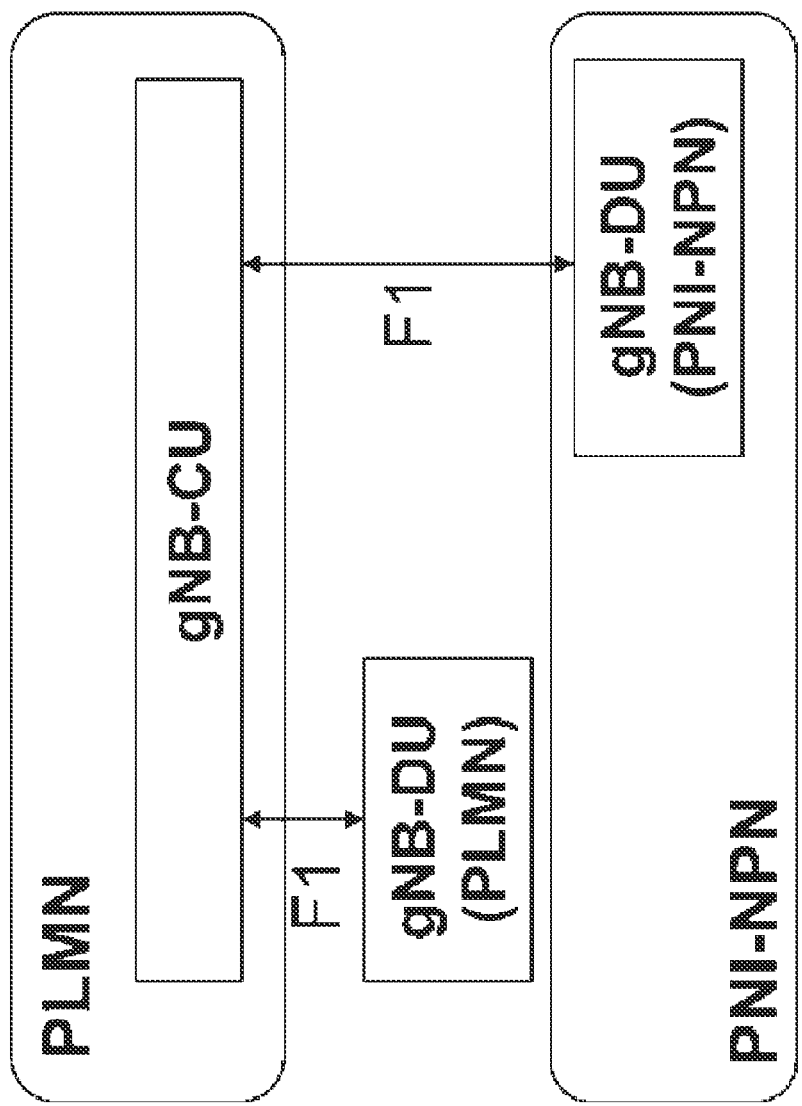
FIG. 5A is a block diagram of two different deployments of a PNI-NPN to which example embodiments of the invention may be applied.
Figure 5B:
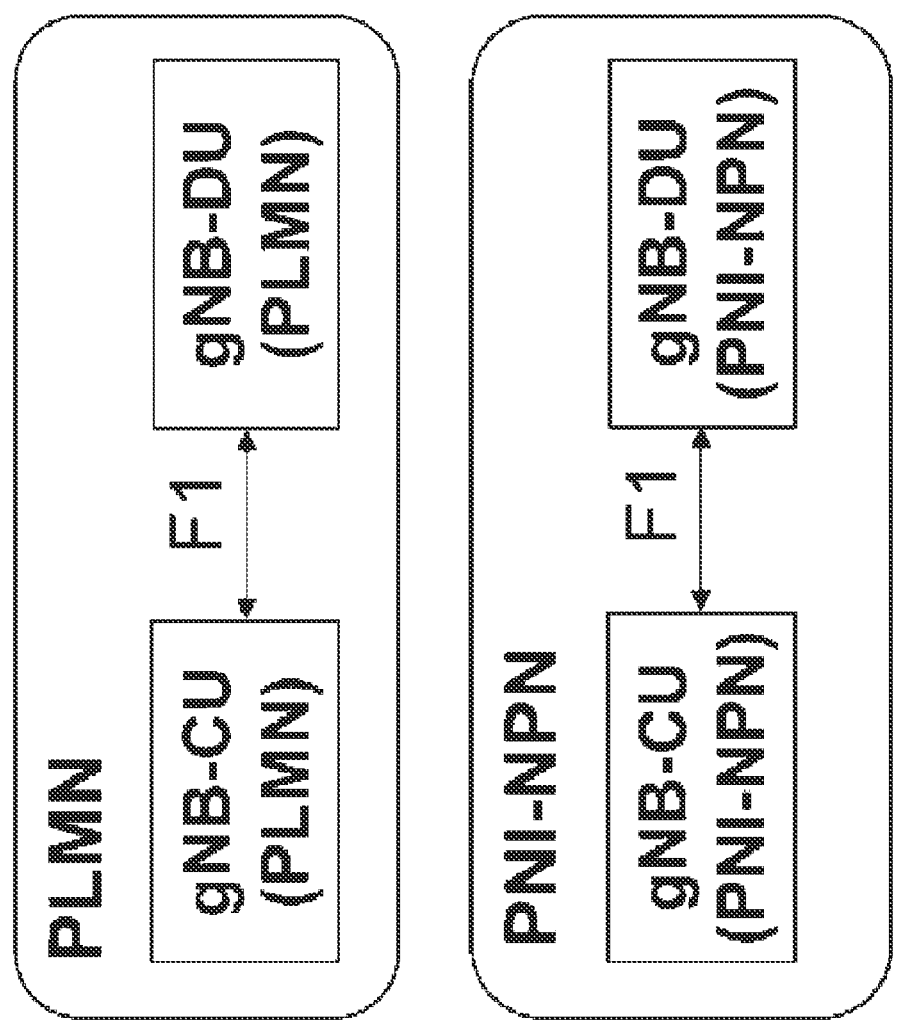
FIG. 5B is a block diagram of two different deployments of a PNI-NPN to which example embodiments of the invention may be applied.

In the case of a PNI-NPN, the gNB-CU functionality for all of the gNBs in a network may be implemented and located in the same secure location, for example, as in a data centre or operator's building. With reference to FIGS. 5A and 5B, two typical deployment examples of this concept are illustrated. In FIG. 5A, the CU for the PNI-NPN gNB (located within the secure environment) is hosted with the support of a PLMN and shared with authorised gNBs outside of the PNI-NPN, using network CAG Access control. In FIG. 5B, the PNI-NPN is a standalone NPN, with the CU for the PNI-NPN gNB being implemented within the PNI-NPN, and without the support of a PLMN. Similarly, the CU for a gNB within the PLMN is hosted within that PLMN.

In both cases, the gNB-CU for the PNI-NPN is a centralised function, potentially serving multiple gNBs in the PNI-NPN, and the gNB-DU portions correspond to respective cells (which may be associated with one or more CAG(s)). Whenever the term 'base station' is used in the following description, it may be interpreted as the gNB-CU part of a distributed base station.

A more detailed description will now be given (with reference to FIGS. 6 to 8) of various ways in which manual CAG selection may be implemented in the system shown in FIG. 1, including associated UE subscription update procedures.

Operation—First Scenario

Figure 6:
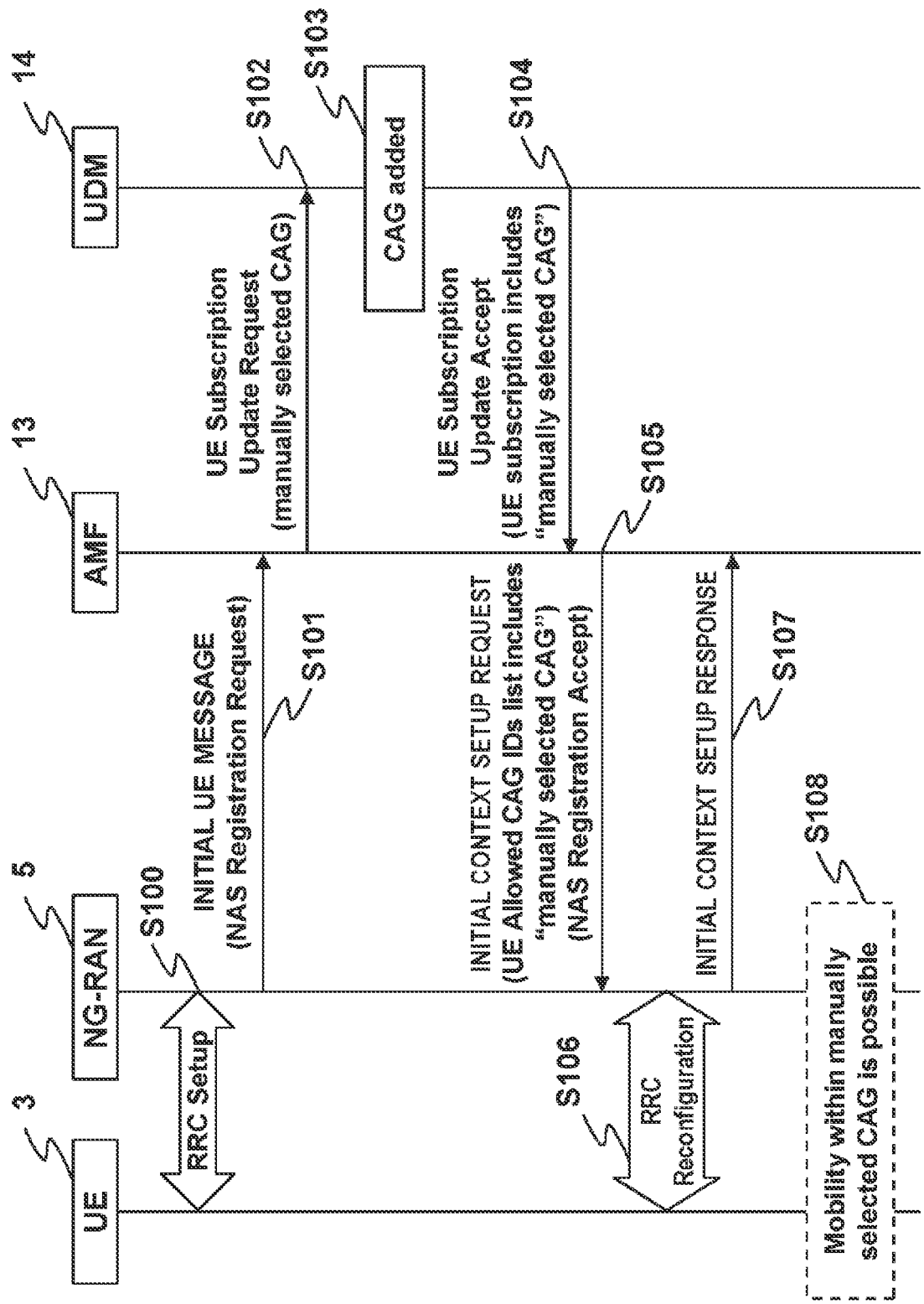
FIG. 6 is a timing diagram illustrating exemplary ways in which example embodiments of the invention can be implemented in the system of FIG. 1.

FIG. 6 is a timing diagram (message sequence chart) illustrating a first example process performed by the components of the system 1 when the UE 3 selects a CAG manually. In this scenario, the manually selected CAG ID is added to the Allowed CAG IDs list for the UE 3.

Although not shown in FIG. 6, it will be appreciated that the UE 3 is configured to register with an AMF 13 when the UE 3 is first powered on or when it moves into a service area associated with the AMF 13. As part of this registration, the AMF 13 retrieves (using its CAG module 85), from the UDM function 14, information regarding the UE CAG membership (UE subscription CAG ID list) relevant to this UE 3 so that it can verify which CAG cells can be accessed by the UE 3.

In this example, the user of the UE 3 performs manual CAG selection via the user interface 35 (e.g. the user selects CAG #1 based on its associated name/description). Therefore, using its communications control module 43 and CAG module 45, the UE 3 attempts to find a cell to camp on that belongs to the manually selected CAG ID. Once a cell of the selected CAG is found, the UE 3 proceeds to set up (e.g. (re)establish/resume) an RRC connection with the access network ('NG-RAN' in FIG. 6)/base station 5 operating the selected cell. RRC setup is illustrated in step S100.

As part of the RRC setup, the UE 3 (using its NAS sub-module) transmits an appropriately formatted Initial UE Message to the AMF 13 (via the base station 5), as shown in step S101. The Initial UE Message includes an appropriately formatted NAS Registration Request for registering the UE 3 with the core network 7 (i.e. the AMF 13) on the Non-Access Stratum level. The Initial UE Message/NAS Registration Request includes an identifier (CAG ID) of the CAG selected by the user. The AMF 13 performs UE access verification based on UE CAG membership information (retrieved from the UDM function 14), in order to determine whether the UE 3 is a member of the selected CAG.

Normally, when the AMF 13 determines that the manually selected CAG ID is not part of the UE's subscription, the AMF 13 rejects the UE's registration via that cell. However, in this example, the AMF 13 is configured to keep the UE 3 on the selected cell (i.e. the cell of the base station 5 that belongs to the manually selected CAG ID #1). This may be beneficial for example for the purposes of load balancing among the cells of the network 1 and/or for the provision of appropriate services (e.g. Quality of Service, Quality of Experience, type of service etc.) which may not be possible via other cells in the vicinity of the UE 3.

In order to ensure that the UE 3 is able to continue using the manually selected CAG (and hence avoid having to re-select to a cell that belongs to a different CAG), the AMF 13 informs the UDM function 14 about the CAG selected by the UE 3 (when the AMF 13 decides to keep the UE 3 on that cell). Specifically, as shown in step S102, the AMF 13 sends the manually selected CAG ID (in this example CAG #1) to the UDM function 14 and requests updating the UE CAG membership (UE subscription) held by the UDM function 14 to include the manually selected CAG ID. In other words, the AMF 13 may be configured to override the currently applicable UE subscription information in order to comply with the manual CAG selection by the user of the UE 3.

In this case, in step S103, the UDM function 14 approves the addition of the manually selected CAG ID (CAG #1) to the UE subscription information. Accordingly, the UDM function 14 sends, in step S104, the updated UE subscription to the AMF 13 (i.e. the UE subscription information that now includes CAG #1 or appropriate information indicating that CAG #1 has been added to the UE subscription information).

Upon receipt of the message in step S104, the AMF 13 adds the manually selected CAG ID to the UE Allowed CAG IDs list for this UE 3. Therefore, the AMF 13 accepts the UE's NAS registration request (included in the Initial UE Message in step S101) and the UE registration procedure is considered successful on the manually selected CAG cell. The AMF 13 sends, in step S105, the updated UE Allowed CAG IDs list to the base station 5, and the base station 5 keeps the UE 3 on the cell in the RRC Connected state by performing an appropriate RRC Reconfiguration procedure with the UE 3 (in step S106). In this example, the AMF 13 sends the updated UE Allowed CAG IDs list in an appropriately formatted 'Initial Context Setup Request' message which is confirmed by the base station 5 (in step S107) using an appropriate 'Initial Context Setup Response' message. The message from the AMF 13 may also include an appropriately formatted 'NAS Registration Accept' message for the UE 3 to confirm the requested NAS registration.

It will be appreciated that in this example the mobile device 3 (in RRC Connected state) is allowed to use the manually selected CAG cell and/or any other cells of the same CAG as a cell of a Dual Connectivity (DC) and/or Carrier Aggregation (CA) configuration, and also for mobility purposes (i.e. move/handover between cells of the same CAG as if the mobile device 3 were a member of that CAG). Similarly, a mobile device 3 in the RRC Idle state may (re)select any cell of the manually selected CAG to camp on as if the mobile device 3 were a member of that CAG. Thus, beneficially, the cells that belong to the manually selected CAG ID will be considered as suitable cells for subsequent Idle mode mobility (cell selection/re-selection) or Connected mode mobility (Xn and NG based mobility), as generally shown in step S108.

Operation—Second Example

Figure 7:
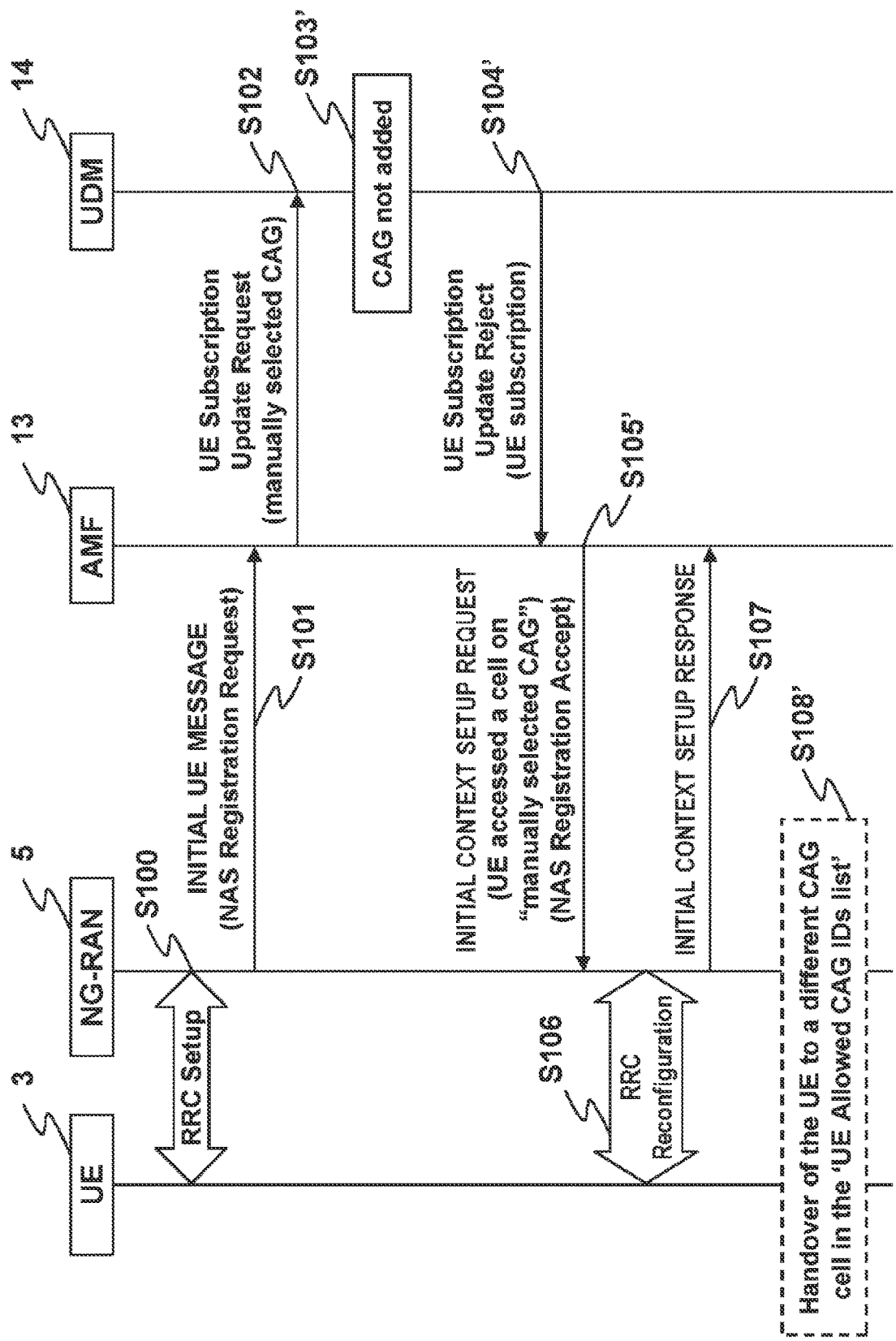
FIG. 7 is a timing diagram illustrating exemplary ways in which example embodiments of the invention can be implemented in the system of FIG. 1.

FIG. 7 is a timing diagram (message sequence chart) illustrating a second example process performed by the components of the system 1 when the UE 3 selects a CAG manually. In this scenario, the manually selected CAG ID is not added to the Allowed CAG IDs list for the UE 3, and the UE 3 is handed over to another cell.

In this example, steps S100 to S102 are the same as in the previous example. However, as shown in step S103', in this case the UDM function 14 rejects the addition of the manually selected CAG ID to the UE CAG subscription information. Accordingly, in step S104', the UDM function 14 informs the AMF 13 that the manually selected CAG ID has not been added. This may be realised, for example, by the UDM function 14 re-sending the (unchanged) UE subscription to the AMF 13 which does not include the manually selected CAG ID. Alternatively, or in addition, the UDM function 14 may be configured to send an appropriate response to the AMF 13 comprising information indicating that the requested CAG ID has been rejected for this UE 3 (e.g. using an information element indicating that the manually selected CAG ID is not added to the UE subscription or indicating that it has been removed from the UE subscription).

However, the AMF 13 may be configured to accept the UE registration request (Initial UE Message) and consider the UE registration procedure successful on the cell that belongs to the manually selected CAG ID. Effectively, in this case, the UE 3 is allowed to establish a connection with the core network 7, even though it is not allowed to use the selected CAG cell. Accordingly, in step S105', the AMF 13 informs the base station 5 operating the selected cell that the UE 3 is not allowed to use that cell (the CAG associated with that cell). For example, the AMF 13 may send an 'Initial Context Setup Request' to the base station 5 including information indicating that the cell belongs to a manually selected CAG (or more specifically, a manually selected CAG that is not included in the list of CAGs allowed for the UE 3). It will be appreciated that the information may be indicated implicitly, e.g. by sending a list of CAGs that are allowed for the UE 3, from which the base station 5 can determine that the manually selected CAG is not allowed for the UE 3. Upon receipt of the indication from the AMF 13, the base station 5 initiates a handover of the UE 3 to a suitable target cell, e.g. a cell that belongs to a CAG on the UE's Allowed CAG IDs list. The message from the AMF 13 may also include an appropriately formatted 'NAS Registration Accept' message for the UE 3 to confirm the requested NAS registration (even though the UE is not allowed to use the manually selected CAG cell). In step S107, the base station 5 sends an 'Initial Context Setup Response' message to the AMF 13 to confirm that the context has been set up as requested.

Alternatively, the AMF 13 may be configured to reject the UE's registration request and initiate a process to release the UE 3 (by sending an appropriate response (e.g. 'NAS Registration Reject' in step S105') informing the UE 3 that the selected CAG cannot be used). In this case, in step S108', the base station 5 releases the RRC connection with the UE 3 (after forwarding the response to the UE 3). Thus, in this case the UE 3 moves to the RRC Idle state (and may also notify the user that the manual CAG selection has failed so that the user can select a different cell, such as a public cell or a cell of a different CAG).

Operation—Third Example

Figure 8:
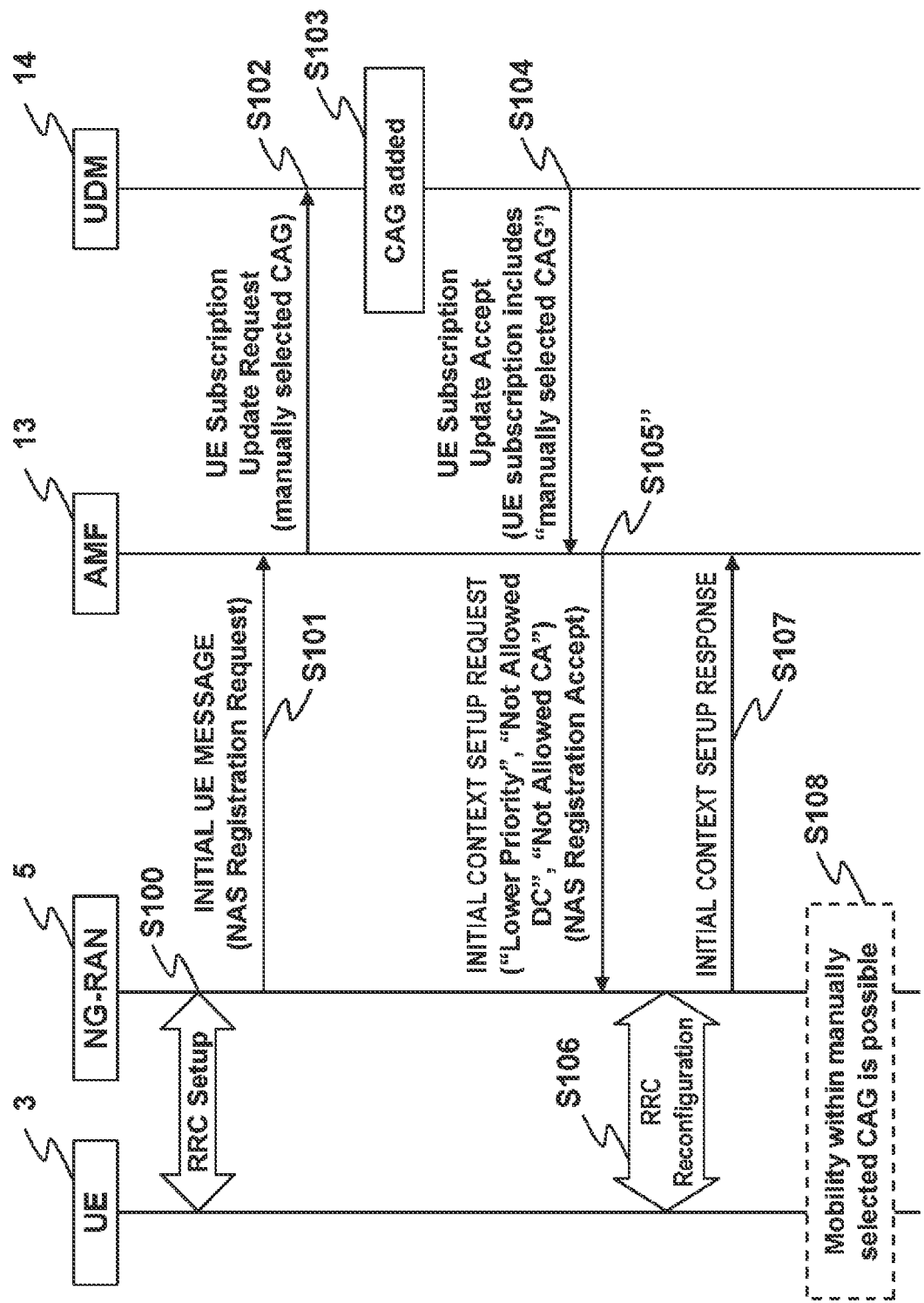
FIG. 8 is a timing diagram illustrating exemplary ways in which example embodiments of the invention can be implemented in the system of FIG. 1.

FIG. 8 is a timing diagram (message sequence chart) illustrating a third example process performed by the components of the system 1 when the UE 3 selects a CAG manually. Similarly to the first scenario, the manually selected CAG ID is added to the Allowed CAG IDs list for the UE 3.

Steps S100 to S104 are the same as described above. Thus, the UDM function 14 approves the request from the AMF 13 to add the manually selected CAG ID to the UE's subscription (in step S103) and sends the updated UE subscription to the AMF 13 (in step S104).

The AMF 13 adds the manually selected CAG ID to the UE Allowed CAG IDs list and proceeds to accept the UE registration request on the cell that belongs to the manually selected CAG ID (after a confirmation from the UE 3, the UE registration procedure is considered successful). Therefore, the AMF 13 sends the updated UE Allowed CAG IDs list to the base station, in step S105", and the base station 5 is configured to keep the UE 3 on the CAG cell in the RRC connected state. However, in this case, the message from the AMF 13 ('Initial Context Setup Request') also informs information indicating that the UE 3 has a (relatively) "lower priority" in terms of cell access (e.g. allocated resources) compared to other UEs that are members of the manually selected CAG. Specifically, the 'Initial Context Setup Request' may include an appropriate information element (e.g. in the 'Mobility restriction list' IE and/or the like) indicating that the UE 3 is to be treated with low priority in the given CAG (e.g. a "low priority" IE, "manual CAG" IE, and/or the like). It will also be appreciated that the information element may comprise a "DC not allowed" IE and/or a "CA not allowed" IE for a more precise indication of the services that are allowed/not allowed for the UE 3 in the manually selected CAG. Thus, based on the received indication, the base station 5 may decide not to configure Dual Connectivity or Carrier Aggregation operation for the UE 3 in cells of the manually selected CAG ID (as long as the low priority setting remains valid for this UE 3). The message from the AMF 13 (in step S105") may also include an appropriately formatted 'NAS Registration Accept' message for the UE 3 to confirm the requested NAS registration. In step S107, the base station 5 sends an 'Initial Context Setup Response' message to the AMF 13 to confirm that the context has been set up as requested.

Accordingly, in this example, the mobile device 3 is not allowed to use the manually selected CAG cell (and/or any other cells of the same CAG) for Dual Connectivity/Carrier Aggregation, although it may still use the manually selected CAG cell with a relatively low priority (compared to UEs that are members of the associated CAG). As generally shown in step S108, the UE 3 may also be able to use any other cells of the same CAG for subsequent Idle mode mobility (cell selection/re-selection) or Connected mode mobility (Xn and NG based handover). It will be appreciated that in case of mobility the base station 5 may be configured to signal (e.g. using an appropriate information element) that DC/CA is not allowed for this UE in the current CAG (or that the UE has a lower priority) during Xn/NG handover procedures to a target NG-RAN node (base station).

Operation—RRC Inactive

For the latest developments of the 3GPP standards, mobile devices 3 may also operate in a new RRC state, or new radio state, referred to as an 'RRC Inactive' state (e.g. in 5G), or a 'light-connected' (LC) state/mode (e.g. in LTE/4G). It will be appreciated that the components of the network 1 may be configured to operate differently in case the mobile device 3 is in the RRC Inactive state as described below.

When a mobile device 3 is in the RRC inactive state, the core network 7 maintains both its control-plane and user-plane connection even after the mobile device 3 has no more data to send or receive (and hence it is normally configured to enter the RRC idle mode). In other words, even though in the RRC inactive state/mode the mobile device 3 is seen as operating in idle mode from the radio access network's (base station's) point of view, it may still be seen as being connected from the core network's point of view (even though there is no active RRC connection (i.e. SRB/DRB) between the base station 5 and the RRC inactive state UE 3). One of the benefits of this new RRC inactive state/mode is that mobile devices 3 (IoT devices in particular) that have small and infrequent data transmissions do not need to perform the entire RRC connection establishment procedure every time they have data to send (or receive). Instead, an RRC inactive state/mode capable mobile device 3 can be configured to resume its existing RRC connection with the current base station 5 whenever needed and then return to a more power efficient mode of operation until it has data to send/receive again. The mobile device 3 can resume its RRC connection by sending to its current base station 5 information (e.g. a resume ID) identifying the connection to be resumed. This beneficially avoids the base station 5 and the mobile device 3 having to go through authentication and radio bearer establishment. The resume ID is assigned by the base station 5 that suspended the RRC connection and it is associated with that base station 5. Accordingly, the resume ID used in this system is also associated with any CAG that the base station 5 is a member of. Thus, when the mobile device 3 attempts to resume its RRC connection in a different CAG cell, the base station 5 operating that cell is able to verify, based on the resume ID, whether the mobile device 3 has previously accessed that CAG (and allow/reject the connection to be resumed accordingly).

Referring to the examples described above with reference to FIGS. 6 and 8, the UE 3 in RRC Inactive performs manual CAG selection and finds a cell to camp on that belongs to the manually selected CAG ID. The UE 3 starts the registration process on the cell by sending an appropriately formatted RRC resume request to the base station 5 including an 'Initial UE Message' for the AMF 13.

The AMF 13 sends the manually selected CAG ID to the UDM function 14 which adds the CAG ID to UE subscription. The UDM function 14 sends the updated UE subscription to the AMF 13, which accepts the UE registration request on the cell that belongs to the manually selected CAG ID. The AMF 13 sends the updated UE Allowed CAG IDs list to the base station 5 which keeps the UE on the CAG cell in the RRC connected state (i.e. the RRC connection has been resumed).

However, it will be appreciated that the UE 3 may not be allowed to move to the RRC inactive state whilst in the manually selected CAG. Specifically, the AMF 13 may be configured to send an appropriate indication to the base station 5 that the UE 3 should not be allowed to move to the RRC Inactive state. For example, the indication may comprise an indication that the UE 3 has a "lower priority" (as in the third example above) or any other suitable indication that RRC Inactive state is not allowed in the current cell (current CAG). The AMF 13 may include an appropriate information element (e.g. a "not allowed RRC Inactive" IE) in the UE Context Setup message in step S105 (or step S105"). Additionally, the "not allowed RRC Inactive" indication may also be signaled during Xn/NG handover procedures to the target base station.

It will be appreciated that in the manually selected CAG (even if it has been added by the UDM function 14 to the subscription information for the UE 3), the base station 5 may be configured to release the UE 3 (in case of no UE signalling/data exchange) instead of moving it to the RRC inactive state. This may allow the base station 5 to prevent the "lower priority" UE 3 from consuming resources of the cell (e.g. resources needed to maintain UE context in both the CN and the RAN).

Alternatively, the UE 3 may be allowed to move to the RRC inactive state in the manually selected CAG (when instructed by the base station 5 e.g. in case of no UE signalling/data exchange within a predetermined period). In this case there are two possibilities.

In a first possibility, the UE 3 resumes its RRC connection from a cell that belongs to the same (manually selected) CAG ID as the newly selected cell. Since this CAG ID has been added to the UE Allowed CAG IDs list, the base station that serves the new CAG cell can verify the UE's access to that cell, based on the UE Allowed CAG IDs list (held by the base station that suspended the RRC connection, i.e. the 'anchor' base station).

In a second possibility, the UE 3 resumes its RRC connection from a cell that belongs to a different manually selected CAG ID operated by a different base station to the one that suspended the RRC connection (i.e. the 'anchor' base station). The manually selected CAG ID of the new cell is not part of the UE Allowed CAG IDs list. Therefore, the new (target) base station sends the supported CAG ID(s) of the CAG cell (including the manually selected CAG ID) to the anchor base station (e.g. the supported CAG ID(s) may be included in a 'Retrieve UE Context Request' message or similar). The old (source) base station forwards the CAG ID(s) supported by the target base station 5 to the AMF 13 to perform UE access verification on the CAG cell that belongs to the new manually selected CAG ID. The rest of the procedure may follow any of the above described examples.

In some cases, the core network 7 (the AMF 13 or the UDM function 14) may change the UE's access to the manually selected CAG ID whilst the UE 3 is in the RRC inactive state. For example, the UE's access to the manually selected CAG may change from 'allowed' to 'not allowed' or from 'normal' to 'low' priority (or vice versa).

Thus, it will also be appreciated that when the core network 7 changes the UE's access, the corresponding UE Allowed CAG IDs list may be updated even without (or before) receiving an 'Initial UE Message' from the UE 3 or without the UE 3 requesting resumption of its RRC connection.

For example, when the UE's access changes to not allowed, the AMF 13/UDM function 14 may remove the manually selected CAG ID from the UE's Allowed CAG IDs list and notify the anchor base station about the change (by sending an appropriate context update request). In this case when the UE 3 resumes its RRC connection (by sending an RRC Resume Request message) in a cell that belong to the manually selected CAG ID, the base station 5 knows (from the local UE context or the context held at the anchor base station) that the UE 3 is no longer allowed access to cell(s) of this CAG ID. Therefore, the base station 5 can reject the UE's Resume Request and release the UE 3 to RRC Idle state.

Similarly, when the UE's access changes to allowed (e.g. from 'lower priority'), the AMF 13/UDM function 14 may add the manually selected CAG ID to the UE's Allowed CAG IDs list and send the anchor base station the updated list (in an appropriate context update request). Therefore, the base station 5 can allow the UE's Resume Request to proceed and allow the UE 3 to enter RRC Connected state in the CAG cell (and also allow DC/CA operation if appropriate).

Beneficially, the core network 7 can timely update the UE's Allowed CAG IDs list to the base station 5 (e.g. using the UE Context Modification Request message) and ensure that the UE 3 always operates in the correct mode.

In a modification of this procedure, the base station 5 may be configured to request the AMF 13 to provide assistance information before it decides how to handle the UE's request to resume in a CAG cell. For example, when the base station 5 detects that the UE 3 is not active for a period of time, the base station 5 may send a query message to the AMF 13 to provide updated assistance information (e.g. information regarding whether the UE 3 is allowed or not allowed access to a particular CAG in the RRC inactive state). In this case the AMF 13 obtains the latest UE access allowance information from the UDM function 14 or the Authentication Server Function (AUSF) upon request by the base station 5. If the UE's access has changed from "allowed" to "not allowed" on cells that belongs to a manually selected CAG ID, then the base station 5 initiates the release of the UE's RRC Connection. Otherwise, if the UE 3 is still "allowed" access, then the base station 5 moves the UE 3 to (or keeps in) the RRC Inactive state. Similarly, if the UE's access allowance information is changed from "not allowed" to "allowed", the base station 5 moves the UE 3 to the RRC Inactive state (e.g. from RRC Connected).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above examples, the AMF is configured to allow manually selecting a CAG cell even when that cell does not belong to any CAG associated with the user (subscriber) of the UE. However, it will be appreciated that it may not always be possible to keep a UE on a CAG cell when the UE is not a member of the associated CAG. For example, the AMF may be configured to accept manual CAG selection with respect to certain UEs and/or CAGs only, and the decision by the AMF may also take into account any appropriate network criteria associated with the UE and/or the selected CAG. Manual CAG selection may also be allowed within a certain service or geographical area and/or it may have a limited duration. The AMF may also be configured to involve another node in its decision whether to allow the UE to use the manually selected CAG cell. Alternatively, the decision may be made by a different node and the AMF may be configured to execute the decision on (whether to allow or reject) the UE's manual CAG selection.

Figure 9:
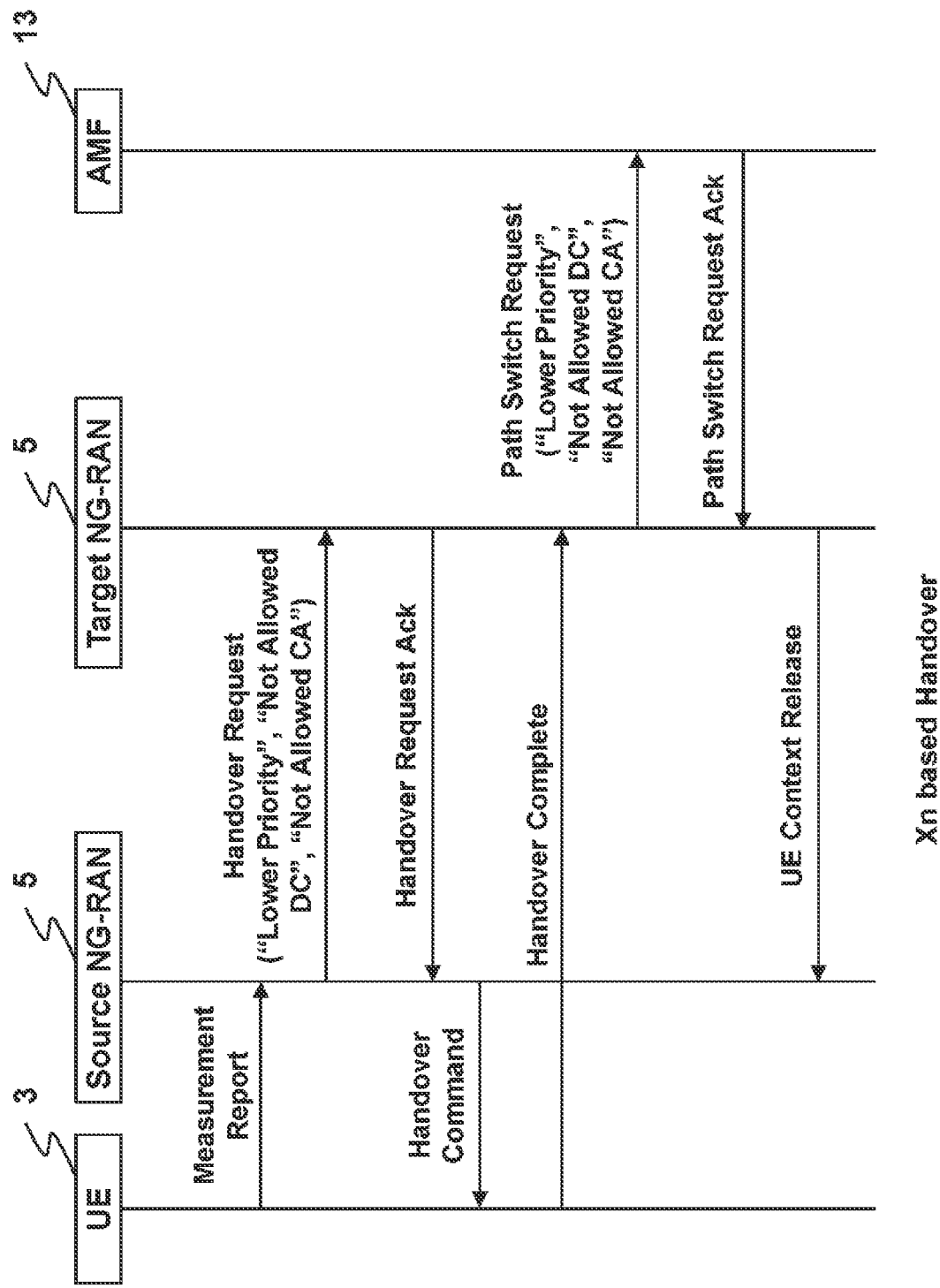
FIG. 9 is a timing diagram illustrating exemplary ways in which example embodiments of the invention can be implemented in the system of FIG. 1.
Figure 10:
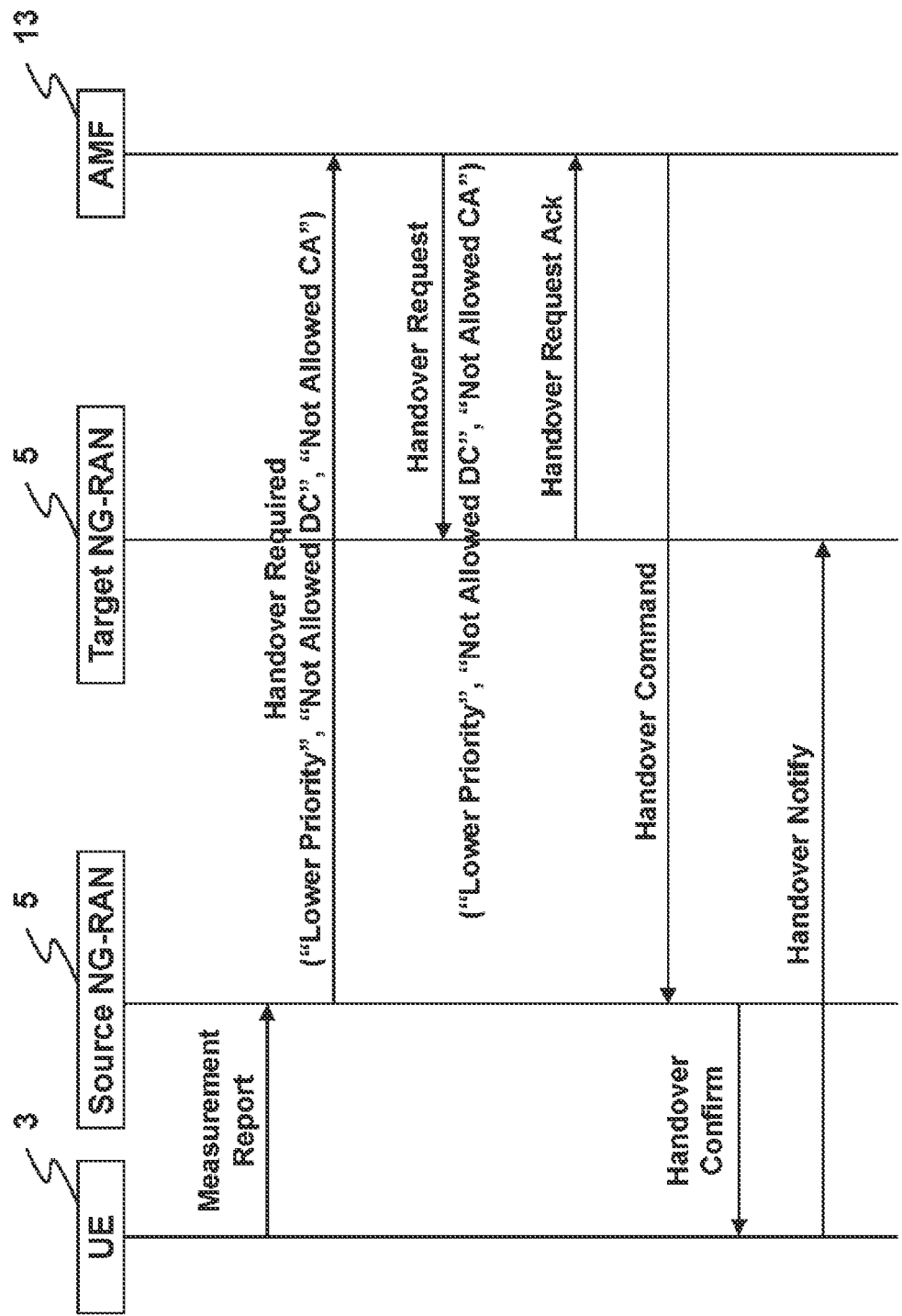
FIG. 10 is a timing diagram illustrating exemplary ways in which example embodiments of the invention can be implemented in the system of FIG. 1.

It will be appreciated that any information from the AMF relating to the CAG (e.g. manually selected CAG, any information elements such as priority level, DC/AC not allowed) may also be transferred from the base station to other nodes (over the NG or the Xn interface). For example, the information from the AMF may be included in a 'Path Switch Request Acknowledge' message when the base station (as a source node) does not support this function. The information from the AMF may also be included in a 'Downlink NAS Transport' message whenever the UE's situation changes (e.g. between "not-allowed" and "allowed" or between "lower priority" and "allowed"/"not-allowed"). The information from the AMF may also be included in a 'Source to Target Transparent Container' information element, e.g. for testing if the target node supports this function or not. If the target node supports the function, then the target node also sets the information in the 'Target to Source Transparent Container' accordingly. The information from the AMF may also be included in a 'Handover Request' message when performing NG based UE handover. It will be appreciated that the CAG related information may also be included in other messages, if appropriate. FIGS. 9 and 10 illustrate the exemplary procedures where an indication of "Lower Priority", "Not Allowed DC", "Not Allowed CA" is sent by the (source) base station towards the target base station/AMF as part of an Xn based Handover and an NG based Handover, respectively.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to 'internet of things' (IoT), using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 1

| Service Area | MTC applications |
| --- | --- |
| Security | Surveillance systems<br>Backup for landline<br>Control of physical access (e.g. to buildings)<br>Car/driver security |

TABLE 1-continued

| Service Area | MTC applications |
| --- | --- |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote | Sensors |
| Maintenance/Control | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an Mobile Virtual Network Operator (MVNO) service, an emergency radio communication system, a Private Branch eXchange (PBX) system, a PHS/Digital Cordless Telecommunications system, a Point of sale (POS) system, an advertise calling system, a Multimedia Broadcast and Multicast Service (MBMS), a Vehicle to Everything (V2X) system, a train radio system, a location related service, a Disaster/Emergency Wireless Communication Service, a community service, a video streaming service, a femto cell application service, a Voice over LTE (VoLTE) service, a charging service, a radio on demand service, a roaming service, an activity monitoring service, a telecom carrier/communication NW selection service, a functional restriction service, a Proof of Concept (PoC) service, a personal information management service, an ad-hoc network/Delay Tolerant Networking (DTN) service, etc.

Further, the above-described UE categories are merely examples of applications of the technical ideas and exemplary embodiments described in the present document. Needless to say, these technical ideas and example embodiments are not limited to the above-described UE and various modifications can be made thereto. When the CAG identifier has been manually selected, the method performed by a base station may comprise managing access of the UE to the CAG cell by performing one of the following: i) setting up an initial context for the UE and allowing the UE to communicate via said CAG cell; ii) setting up an initial context for the UE and handing over the UE to another cell that does not have the same CAG identifier; and iii) setting up an initial context for the UE and instructing the UE to move to a Radio Resource Control (RRC) Idle state. When the UE is allowed to access said CAG cell, the method may comprise restricting at least one service for the UE in said CAG cell and/or in another cell having the same CAG identifier (e.g. a Dual Connectivity service or a Carrier Aggregation service).

The method performed by a base station may further comprise obtaining said subscription information associated with the UE from an Access and Mobility Function (AMF) or from another base station.

The method performed by a base station may further comprise obtaining updated subscription information associated with the UE while the UE is in an RRC Inactive state, and updating said access of the UE to the CAG cell in dependence on said updated subscription information.

The subscription information may identify a plurality of CAGs that the UE is allowed to access and information identifying that the CAG identifier associated with the CAG cell has been manually selected.

The method performed by a base station may further comprise transmitting, to at least one further node (e.g. a target base station), said information identifying that said CAG identifier has been manually selected and/or information identifying at least one service that is not allowed for the UE in said CAG.

The method performed by a base station may further comprise initiating a procedure for handing over the UE to a target cell having the same manually selected CAG identifier, and transmitting, to at least one of a target base station operating the target cell and the AMF, said information identifying that said CAG identifier has been manually selected and/or information identifying at least one service that is not allowed for the UE in said CAG.

The method performed by an AMF may further comprise initiating a procedure for updating said subscription information associated with the UE when it is determined that the UE is not allowed to access said CAG, and controlling access of the UE to the CAG cell, or another CAG cell having the same associated CAG identifier, in dependence on a result of said procedure.

When the CAG identifier has been manually selected, the method performed by an AMF may comprise managing access of the UE to the CAG cell by performing one of the following: i) setting up an initial context for the UE and allowing the UE to communicate via said CAG cell; ii) setting up an initial context for the UE and handing over the UE to another cell that does not belong to the same CAG; and iii) setting up an initial context for the UE and instructing the UE to move to a Radio Resource Control (RRC) idle state.

When the UE is allowed to access said CAG cell, the method performed by an AMF may comprise restricting at least one service for the UE in said CAG cell and/or in another cell having the same CAG identifier.

The method performed by an AMF may further comprise receiving, from said base station or another base station, a message for initiating a procedure for handing over the UE to a CAG cell having the same manually selected CAG identifier, the message including information identifying that said CAG identifier has been manually selected and/or information identifying at least one service that is not allowed for the UE in said CAG.

The method performed by an AMF may further comprise obtaining said subscription information associated with the UE from a Unified Data Management (UDM) function or an Authentication Server Function (AUSF).

Various other modifications will be apparent to those skilled in the art and will not be described in further detail here.

(Supplementary Note 1)

A method performed by a base station in a Non-Public communication Network in which the base station operates at least one closed access group (CAG) cell, the method comprising:

receiving, from a user equipment (UE), a message initiating a communications connection via a CAG cell operated by the base station, wherein the CAG cell is associated with a CAG having a CAG identifier which has been manually selected by a user of the UE; determining, based on subscription information associated with the UE and information identifying that said CAG identifier has been manually selected, whether to allow the UE to access the CAG cell; and managing access of the UE to the CAG cell in dependence on said determination.

(Supplementary Note 2)

The method according to supplementary note 1, wherein when said CAG identifier has been manually selected, managing access of the UE to the CAG cell by performing one of the following: i) setting up an initial context for the UE and allowing the UE to communicate via said CAG cell; ii) setting up an initial context for the UE and handing over the UE to another cell that does not have the same CAG identifier; and iii) setting up an initial context for the UE and instructing the UE to move to a Radio Resource Control (RRC) Idle state.

(Supplementary Note 3)

The method according to supplementary note 2, wherein when the UE is allowed to access said CAG cell, the method comprises restricting at least one service for the UE in said CAG cell and/or in another cell having the same CAG identifier (e.g. a Dual Connectivity service or a Carrier Aggregation service).

(Supplementary Note 4)

The method according to any of supplementary notes 1 to 3, further comprising obtaining said subscription information associated with the UE from an Access and Mobility Function (AMF) or from another base station.

(Supplementary Note 5)

The method according to any of supplementary notes 1 to 4, further comprising obtaining updated subscription information associated with the UE while the UE is in an RRC Inactive state, and updating said access of the UE to the CAG cell in dependence on said updated subscription information.

(Supplementary Note 6)

The method according to any of supplementary notes 1 to 5, wherein the subscription information identifies a plurality of CAGs that the UE is allowed to access and information identifying that the CAG identifier associated with the CAG cell has been manually selected.

(Supplementary Note 7)

The method according to any of supplementary notes 1 to 6, further comprising transmitting, to at least one further node (e.g. a target base station), said information identifying that said CAG identifier has been manually selected and/or information identifying at least one service that is not allowed for the UE in said CAG.

(Supplementary Note 8)

The method according to any of supplementary notes 1 to 7, further comprising initiating a procedure for handing over the UE to a target cell having the same manually selected CAG identifier, and transmitting, to at least one of a target base station operating the target cell and the AMF, said information identifying that said CAG identifier has been manually selected and/or information identifying at least one service that is not allowed for the UE in said CAG.

(Supplementary Note 9)

A method performed by an Access and Mobility Function (AMF) coupled to a base station in a Non-Public communication Network in which the base station operates at least one closed access group (CAG) cell, the method comprising:

receiving, from a user equipment (UE) in a CAG cell operated by the base station, a message initiating a communications connection via said CAG cell;

obtaining, from a core network function, subscription information associated with the UE for performing CAG membership verification;

determining, based on the message received from the UE and/or the obtained subscription information, that the CAG cell is associated with a CAG having a CAG identifier which has been manually selected by a user of the UE, and determining that the UE is not allowed to access that CAG; and managing access of the UE to the CAG cell, or another CAG cell having the same associated CAG identifier, in dependence on said determination.

(Supplementary Note 10)

The method according to supplementary note 9, further comprising initiating a procedure for updating said subscription information associated with the UE when it is determined that the UE is not allowed to access said CAG, and controlling access of the UE to the CAG cell, or another CAG cell having the same associated CAG identifier, in dependence on a result of said procedure.

(Supplementary Note 11)

The method according to supplementary note 9 or 10, wherein when said CAG identifier has been manually selected, managing access of the UE to the CAG cell by performing one of the following: i) setting up an initial context for the UE and allowing the UE to communicate via said CAG cell; ii) setting up an initial context for the UE and handing over the UE to another cell that does not belong to the same CAG; and iii) setting up an initial context for the UE and instructing the UE to move to a Radio Resource Control (RRC) idle state.

(Supplementary Note 12)

The method according to any of supplementary notes 9 to 11, wherein when the UE is allowed to access said CAG cell, the method comprises restricting at least one service for the UE in said CAG cell and/or in another cell having the same CAG identifier.

(Supplementary Note 13)

The method according to any of supplementary notes 9 to 12, further comprising receiving, from said base station or another base station, a message for initiating a procedure for handing over the UE to a CAG cell having the same manually selected CAG identifier, the message including information identifying that said CAG identifier has been manually selected and/or information identifying at least one service that is not allowed for the UE in said CAG.

(Supplementary Note 14)

The method according to any of supplementary notes 9 to 13, further comprising obtaining said subscription information associated with the UE from a Unified Data Management (UDM) function or an Authentication Server Function (AUSF).

(Supplementary Note 15)

A method performed by a Unified Data Management (UDM) function or an Authentication Server Function (AUSF) coupled to a Non-Public communication Network in which a base station operates at least one closed access group (CAG) cell, the method comprising:

receiving, from an Access and Mobility Function (AMF), a CAG identifier associated with a CAG cell operated by the base station, and information identifying a user equipment (UE) attempting to initiate a communications connection via said CAG cell by manually selecting said CAG identifier;

determining, based on subscription information associated with the UE, whether said UE is subscribed to said CAG; and when it is determined that the UE is not subscribed to said CAG, adding said CAG identifier to a list of Allowed CAG identifiers associated with the UE, and sending said list of Allowed CAG identifiers to the AMF, including said manually selected CAG identifier, for use in managing access of the UE to the CAG cell.

(Supplementary Note 16)

A method performed by a base station in a Non-Public communication Network in which the base station operates at least one closed access group (CAG) cell, the method comprising:

serving a user equipment (UE) via a CAG cell operated by the base station, wherein the CAG cell is associated with a CAG having a CAG identifier which has been manually selected by a user of the UE; and initiating a procedure for handing over the UE to a target cell having the same manually selected CAG identifier, and transmitting, to at least one of a base station operating the target cell and an Access and Mobility Function (AMF), information identifying that said CAG identifier has been manually selected and/or information identifying at least one service that is not allowed for the UE in said CAG.

(Supplementary Note 17)

A method performed by a base station in a Non-Public communication Network in which the base station operates at least one closed access group (CAG) cell as a handover target cell, the method comprising:

receiving, from a source base station serving a user equipment (UE) via a source cell having an associated CAG identifier, a message initiating a procedure for handing over the UE to the target cell having the same CAG identifier, the message including information identifying that said CAG identifier has been manually selected and/or information identifying at least one service that is not allowed for the UE in said CAG.

(Supplementary Note 18)

A method performed by a base station in a Non-Public communication Network in which the base station operates at least one closed access group (CAG) cell, the method comprising:

holding, for a user equipment (UE), a list of at least one CAG identifier associated with respective CAG(s) that the UE is allowed to access;

obtaining, while the UE is in a Radio Resource Control (RRC) Inactive state, information indicating a change to said list; and managing access of the UE to said at least one CAG cell based on the obtained information.

(Supplementary Note 19)

A base station in a Non-Public communication Network in which the base station operates at least one closed access group (CAG) cell, the base station comprising:

means for receiving, from a user equipment (UE), a message initiating a communications connection via a CAG cell operated by the base station, wherein the CAG cell is associated with a CAG having a CAG identifier which has been manually selected by a user of the UE;

means for determining, based on subscription information associated with the UE and information identifying that said CAG identifier has been manually selected, whether to allow the UE to access the CAG cell; and means for managing access of the UE to the CAG cell in dependence on said determination.

(Supplementary Note 20)

A base station in a Non-Public communication Network in which the base station operates at least one closed access group (CAG) cell, the base station comprising:

means for serving a user equipment (UE) via a CAG cell operated by the base station, wherein the CAG cell is associated with a CAG having a CAG identifier which has been manually selected by a user of the UE; and means for initiating a procedure for handing over the UE to a target cell having the same manually selected CAG identifier, and transmitting, to at least one of a base station operating the target cell and an Access and Mobility Function (AMF), information identifying that said CAG identifier has been manually selected and/or information identifying at least one service that is not allowed for the UE in said CAG.

(Supplementary Note 21)

A base station in a Non-Public communication Network in which the base station operates at least one closed access group (CAG) cell as a handover target cell, the base station comprising:

means for receiving, from a source base station serving a user equipment (UE) via a source cell having an associated CAG identifier, a message initiating a procedure for handing over the UE to the target cell having the same CAG identifier, the message including information identifying that said CAG identifier has been manually selected and/or information identifying at least one service that is not allowed for the UE in said CAG.

(Supplementary Note 22)

A base station in a Non-Public communication Network in which the base station operates at least one closed access group (CAG) cell, the base station comprising:

means for holding, for a user equipment (UE), a list of at least one CAG identifier associated with respective CAG(s) that the UE is allowed to access;

means for obtaining, while the UE is in a Radio Resource Control (RRC) Inactive state, information indicating a change to said list; and means for managing access of the UE to said at least one CAG cell based on the obtained information.

(Supplementary Note 23)

An Access and Mobility Function (AMF) coupled to a base station in a Non-Public communication Network in which the base station operates at least one closed access group (CAG) cell, the AMF comprising:

means for receiving, from a user equipment (UE) in a CAG cell operated by the base station, a message initiating a communications connection via said CAG cell;

means for obtaining, from a core network function, subscription information associated with the UE for performing CAG membership verification;

means for determining, based on the message received from the UE and/or the obtained subscription information, that the CAG cell is associated with a CAG having a CAG identifier which has been manually selected by a user of the UE, and for determining that the UE is not allowed to access that CAG; and means for managing access of the UE to the CAG cell, or another CAG cell having the same associated CAG identifier, in dependence on said determination.

(Supplementary Note 24)

An apparatus configured as a Unified Data Management (UDM) function or an Authentication Server Function (AUSF) coupled to a Non-Public communication Network in which a base station operates at least one closed access group (CAG) cell, the apparatus comprising:

means for receiving, from an Access and Mobility Function (AMF), a CAG identifier associated with a CAG cell operated by the base station, and information identifying a user equipment (UE) attempting to initiate a communications connection via said CAG cell by manually selecting said CAG identifier;

means for determining, based on subscription information associated with the UE, whether said UE is subscribed to said CAG; and means for adding, when it is determined that the UE is not subscribed to said CAG, said CAG identifier to a list of Allowed CAG identifiers associated with the UE, and for sending said list of Allowed CAG identifiers to the AMF, including said manually selected CAG identifier, for use in managing access of the UE to the CAG cell.

This application is based upon and claims the benefit of priority from United Kingdom Patent Application No. 2005644.6, filed on Apr. 17, 2020, the disclosure of which is incorporated herein in its entirety by reference.

What is claimed is:

1. A method performed for a base station in a Non-Public Network, the method comprising:

operating at least one cell for at least one closed group;

receiving, from a user equipment (UE) via a cell of the at least one cell, a message for registering the UE with a core network node for mobility management, wherein a closed group from the at least one closed group corresponding to the cell is manually selected by a user of the UE and is not included in an allowed closed group list;

forwarding the message to the core network node;

receiving, from the core network node, a response to the message for allowing the registering of the UE even though the closed group is not included in the allowed closed group list, wherein the allowed closed group list is updated; and configuring a connection with the UE for allowing the UE to communicate via a cell corresponding to another closed group included in the un-updated allowed closed group list to register the UE with the core network node, wherein the allowed closed group list includes information indicating at least one limitation for corresponding cells for the at least one closed group.

2. A base station in a Non-Public Network, the base station comprising:

a memory storing instructions; and at least one processor configured to process the instructions to:

operate at least one cell for at least one closed group;

receive, from a user equipment (UE) via a cell of the at least one cell, a message for registering the UE with a core network node for mobility management, wherein a closed group from the at least one closed group corresponding to the cell is manually selected by a user of the UE and is not included in an allowed closed group list;

forward the message to the core network node;

receive, from the core network node, a response to the message for allowing the registering of the UE even though the closed group is not included in the allowed closed group list, wherein the allowed closed group list is updated; and configuring a connection with the UE for allowing the UE to communicate via a cell corresponding to another closed group included in the un-updated allowed closed group list to register the UE with the core network node, wherein the allowed closed group list includes information indicating at least one limitation for corresponding cells for the at least one closed group.

3. A method performed by a mobile device in a Non-Public Network, the method comprising:

transmitting, to a base station via a cell corresponding to at least one closed group, a message for registering the mobile device with a core network node for mobility management, wherein a closed group from the at least one closed group corresponding to the cell is manually selected by a user of the mobile device and is not included in an allowed closed group list;

configuring a connection with the base station for allowing the mobile device to communicate via a cell corresponding to another closed group included in the allowed closed group list to register the mobile device with the core network node, even though the closed group is not included in the allowed closed group list, wherein the allowed closed group list is not updated, wherein the allowed closed group list includes information indicating at least one limitation for corresponding cells for the at least one closed group.

* * * * *